US009032031B2

(12) United States Patent
Suzuki et al.

(10) Patent No.: US 9,032,031 B2
(45) Date of Patent: May 12, 2015

(54) APPARATUS, METHOD AND COMPUTER PROGRAM PRODUCT FOR PROCESSING EMAIL, AND APPARATUS FOR SEARCHING EMAIL

(75) Inventors: Masaru Suzuki, Kanagawa (JP); Yasuto Ishitani, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 797 days.

(21) Appl. No.: 12/051,444

(22) Filed: Mar. 19, 2008

(65) Prior Publication Data

US 2009/0049144 A1 Feb. 19, 2009

(30) Foreign Application Priority Data

Aug. 16, 2007 (JP) ................................. 2007-212446

(51) Int. Cl.
*G06F 15/16* (2006.01)
*G06Q 10/10* (2012.01)

(52) U.S. Cl.
CPC .................................... *G06Q 10/107* (2013.01)

(58) Field of Classification Search
CPC ..... H04L 51/18; H04L 51/22; H04L 61/1564; H04L 63/0227
USPC ......................................................... 709/206
See application file for complete search history.

(56) References Cited

U.S. PATENT DOCUMENTS

| | | | | |
|---|---|---|---|---|
| 5,647,002 A | * | 7/1997 | Brunson ........................ | 709/206 |
| 6,169,986 B1 | * | 1/2001 | Bowman et al. ...................... | 1/1 |
| 6,212,553 B1 | * | 4/2001 | Lee et al. ........................ | 709/206 |
| 6,473,752 B1 | * | 10/2002 | Fleming, III ........................... | 1/1 |
| 6,816,885 B1 | * | 11/2004 | Raghunandan ................ | 709/206 |
| 7,181,447 B2 | * | 2/2007 | Curtis et al. ............................ | 1/1 |
| 7,593,995 B1 | * | 9/2009 | He et al. ........................ | 709/206 |
| 7,620,690 B1 | * | 11/2009 | Castelli ......................... | 709/206 |
| 7,657,603 B1 | * | 2/2010 | He et al. ........................ | 709/206 |
| 7,844,668 B2 | * | 11/2010 | Canning et al. ................. | 709/206 |
| 7,899,871 B1 | * | 3/2011 | Kumar et al. .................. | 709/206 |
| 7,917,576 B1 | * | 3/2011 | Kling ............................. | 709/203 |
| 7,945,629 B2 | * | 5/2011 | Kritt et al. ...................... | 709/206 |
| 8,032,598 B1 | * | 10/2011 | He et al. ........................ | 709/206 |

(Continued)

FOREIGN PATENT DOCUMENTS

| | | |
|---|---|---|
| JP | 2002-288088 | 10/2002 |
| JP | 2004-234214 | 8/2004 |

(Continued)

OTHER PUBLICATIONS

European Search Report for EP 08005505.6 dated Dec. 10, 2008 corresponding to U.S. Appl. No. 12/051,444, filed Mar. 19, 2008.

(Continued)

*Primary Examiner* — Jimmy H Tran
(74) *Attorney, Agent, or Firm* — Amin, Turocy & Watson, LLP

(57) ABSTRACT

An email processing apparatus determines, from at least one or more of a main body of an email and a subject of an email stored in an email storage unit, a content category of the email; specifies, based on the content category, a search target category of a search target email that relates to the email of the content category; acquires search target information for searching for a search target email of the search target category; and creates a search condition for searching for the search target email containing the search target information in the email storage unit.

9 Claims, 21 Drawing Sheets

(56) References Cited

U.S. PATENT DOCUMENTS

| | | | |
|---|---|---|---|
| 8,713,109 B1* | 4/2014 | Baker et al. | 709/206 |
| 2003/0069877 A1* | 4/2003 | Grefenstette et al. | 707/2 |
| 2003/0172357 A1* | 9/2003 | Kao et al. | 715/529 |
| 2004/0193691 A1* | 9/2004 | Chang | 709/206 |
| 2005/0125374 A1* | 6/2005 | Curtis et al. | 707/1 |
| 2007/0061308 A1* | 3/2007 | Hartwell et al. | 707/3 |
| 2007/0061400 A1* | 3/2007 | Parsons | 709/206 |
| 2009/0055481 A1* | 2/2009 | Carmel et al. | 709/206 |

FOREIGN PATENT DOCUMENTS

| | | |
|---|---|---|
| JP | 2004-246422 | 9/2004 |
| JP | 2004-355166 | 12/2004 |
| JP | 2005-032160 | 2/2005 |
| WO | 03079234 | 9/2003 |

OTHER PUBLICATIONS

Japanese Office Action for Japanese Application No. 2007-212446 mailed on Jan. 4, 2012.

* cited by examiner

FIG.2

NAME
EMAIL ADDRESS
PRODUCT NAME
CONFERENCE/EVENT NAME
CORPORATION/INSTITUTION NAME
PLACE NAME
OTHER

FIG.3

REQUEST
REQUEST FOR PERMISSION/APPROVAL
QUESTION
REPLY
COMPLAINT
APOLOGY
REJECTION
SUGGESTION
REPORT
ASSESSMENT
NEGOTIATION
ADJUSTMENT
GUIDE
CONFERENCE NOTES
NOTIFICATION
CONFIRMATION
REMINDER
INSTRUCTION
WARNING
ADVERTISEMENT
GREETING
SOLICITATION
EVALUATION
ORDER
CONTRACT
PERSONNEL REFERENCE
JOB APPLICATION
REFERENCE
ACCEPTANCE
REMORSE
MEMO
DOCUMENT
OTHER

FIG.4

| CHARACTER STRING PATTERN | MEANING ATTRIBUTE |
|---|---|
| SUZUKI | NAME |
| SATO | NAME |
| TANAKA | NAME |
| NAKAMURA | NAME |
| TSUCHIYA | NAME |
| KOBAYASHI | NAME |
| TOKYO | PLACE NAME |
| KANAGAWA | PLACE NAME |
| SETAGAYA-WARD | PLACE NAME |
| KAWASAKI-CITY | PLACE NAME |
| CORPORATION (%KANJI%+) | CORPORATION/INSTITUTION NAME |
| CORPORATION (%KATAKANA%+) | CORPORATION/INSTITUTION NAME |
| (%KATAKANA%)+TRADING | CORPORATION/INSTITUTION NAME |
| (%ALPHABET%)+ELECTRIC | CORPORATION/INSTITUTION NAME |
| (%ALPHABET%)+ELECTRICS | CORPORATION/INSTITUTION NAME |
| [%ALPHABET%%NUMBER%%SYMBOL%]+ | PRODUCT NAME |
| $CORPORATION/INSTITUTION NAME$ 「([@[^」 ]+)」 | PRODUCT NAME |
| 「([@[^」 ]+)」 \($CORPORATION NAME$\) | PRODUCT NAME |
| ([%ALPHABET%%NUMBER%%SYMBOL%]+ @[%ALPHABET%%NUMBER%%SYMBOL%]+) | EMAIL ADDRESS |
| ([%KANJI%%HIRAGANA%%KATAKANA%]+CONFERENCE) | CONFERENCE/EVENT NAME |
| ([%KANJI%%HIRAGANA%%KATAKANA%]+MEETING) | CONFERENCE/EVENT NAME |
| (%ALPHABET%+20[01][0-9]) | CONFERENCE/EVENT NAME |
| (%ALPHABET%+[01][0-9]) | CONFERENCE/EVENT NAME |

401 (rows: SUZUKI…KAWASAKI-CITY)
402 (CORPORATION (%KANJI%+))
403 (CORPORATION rows through ELECTRICS)
404 ([%ALPHABET%%NUMBER%%SYMBOL%]+ — PRODUCT NAME)
405 (following PRODUCT NAME rows)

FIG.5

| CHARACTER STRING PATTERN | POSITION SPECIFICATION | CATEGORY TYPE | POINTS |
|---|---|---|---|
| PLEASE TELL ME | MAIN BODY | QUESTION | +1 |
| I HAVE A QUESTION | MAIN BODY | QUESTION | +1 |
| QUESTION | SUBJECT | QUESTION | +2 |
| I AM REPLYING | MAIN BODY | REPLY | +1 |
| WE ARE REPLYING | MAIN BODY | REPLY | +1 |
| REPLY | SUBJECT | REPLY | +2 |
| EVALUATION | MAIN BODY | EVALUATION | +1 |
| YOUR EVALUATION | SUBJECT | EVALUATION | +2 |
| CONFERENCE NOTES | SUBJECT | CONFERENCE NOTES | +2 |
| YOUR CONVENIENCE | MAIN BODY | ADJUSTMENT | +1 |
| DATE OF MEETING | MAIN BODY | GUIDE | +1 |
| DATE OF MEETING | MAIN BODY | CONFERENCE NOTES | +1 |
| PARTICIPANTS | MAIN BODY | CONFERENCE NOTES | +1 |

| MEANING ATTRIBUTE | DISPLAYED EMAIL CATEGORY TYPE | SEARCH TARGET EMAIL CATEGORY TYPE |
|---|---|---|
| PRODUCT NAME | QUESTION | EVALUATION, SOLICITATION, ORDER, CONTRACT, REPLY |
| PRODUCT NAME | EVALUATION | SOLICITATION, EVALUATION |
| CONFERENCE/ EVENT NAME | GUIDE | CONFERENCE NOTES, ADJUSTMENT, GUIDE |
| CONFERENCE/ EVENT NAME | CONFERENCE NOTES | GUIDE |
| CORPORATION/ INSTITUTION NAME | NOTIFICATION | NOTIFICATION |
| EMAIL ADDRESS | COMPLAINT | COMPLAINT |

| CATEGORY TYPE | PHRASE |
| --- | --- |
| QUESTION | PLEASE TELL ME |
| QUESTION | I HAVE A QUESTION |
| QUESTION | QUESTION |
| REPLY | I AM (WE ARE?) REPLYING |
| REPLY | REGARDING QUESTION |
| EVALUATION | EVALUATION |
| EVALUATION | YOUR EVALUATION |
| CONFERENCE NOTES | CONFERENCE NOTES |
| ADJUSTMENT | YOUR CONVENIENCE |
| GUIDE | DATE OF MEETING |
| CONFERENCE NOTES | DATE OF MEETING |
| CONFERENCE NOTES | PARTICIPANTS |

FIG.8

| KEYWORD | MEANING ATTRIBUTE | CATEGORY TYPE OF EMAIL BEING VIEWED | SEARCH TARGET EMAIL CATEGORY TYPE | CORRECT EMAIL ATTRIBUTE |
|---|---|---|---|---|
| AC4000 | PRODUCT NAME | ORDER | EVALUATION | SENDER=yokota@mnop.co.jp<br>DESTINATION=sato@abcd.co.jp<br>TRANSMISSION DATE=2006/10/22 09:45<br>ATTACHED FILE=YES<br>ATTACHED FILE EXTENSION=xls |
| DB8200 | PRODUCT NAME | QUESTION | REPLY | SENDER=sato@abcd.co.jp<br>DESTINATION=narita@opqr.co.jp<br>TRANSMISSION DATE=2006/09/12 18:54<br>ATTACHED FILE=NONE<br>ATTACHED FILE EXTENSION= |
| UPS-2000 | PRODUCT NAME | QUESTION | REPLY | SENDER=sato@abcd.co.jp<br>DESTINATION=ishii@gfed.co.jp<br>TRANSMISSION DATE=2006/08/07 13:32<br>ATTACHED FILE=NONE<br>ATTACHED FILE EXTENSION= |
| XYZ TRADING | CORPORATION/ INSTITUTION NAME | SUGGESTION | SUGGESTION | SENDER=sato@abcd.co.jp<br>DESTINATION=murata@vwx.co.jp<br>TRANSMISSION DATE=2006/06/21 21:22<br>ATTACHED FILE=YES<br>ATTACHED FILE EXTENSION=ppt |
| TOZAI ELECTRICS | CORPORATION/ INSTITUTION NAME | REPLY | REPLY | SENDER=sato@abcd.co.jp<br>DESTINATION=hirota@stuv.co.jp<br>TRANSMISSION DATE=2006/04/23 15:22<br>ATTACHED FILE=YES<br>ATTACHED FILE EXTENSION=ppt |

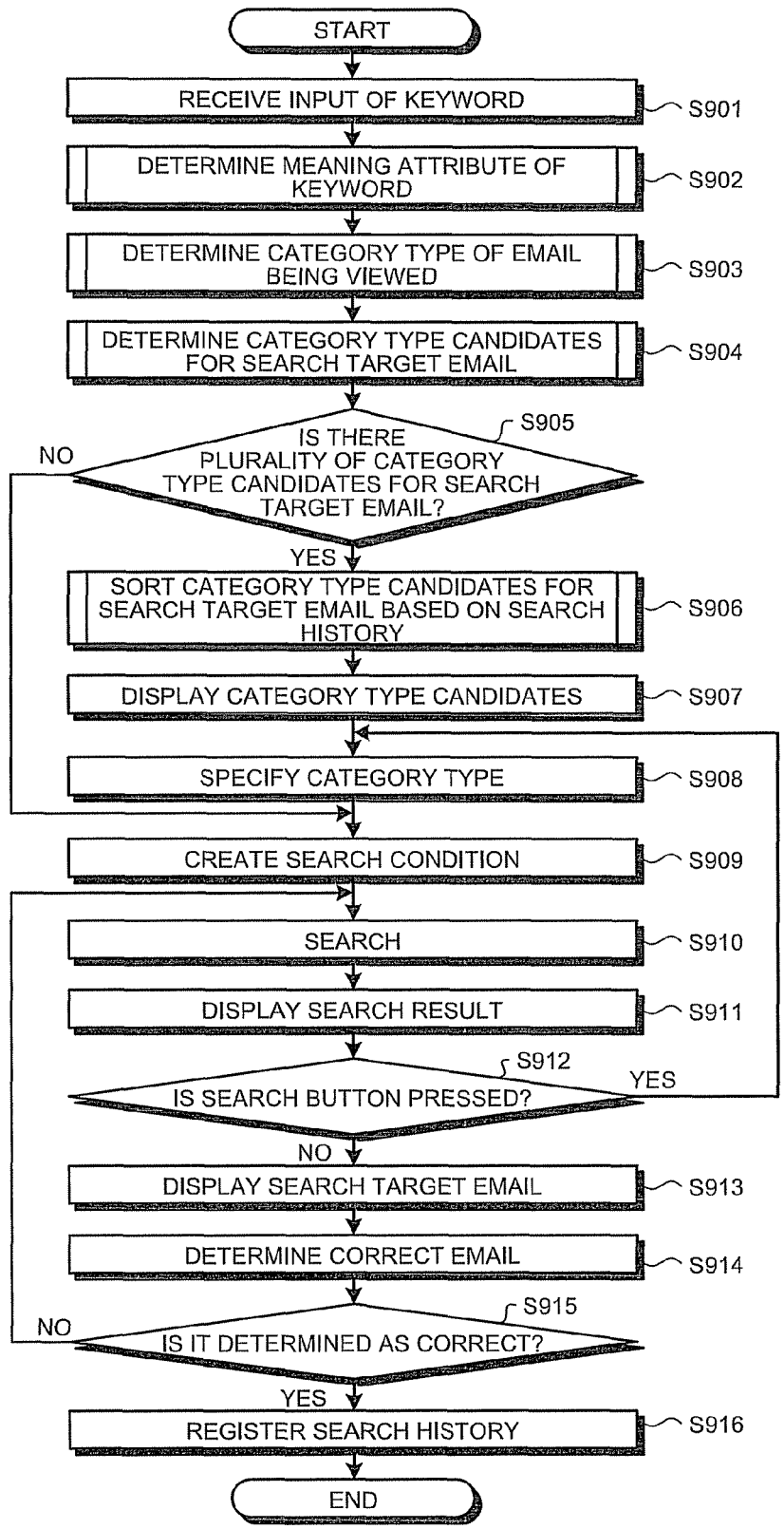

APPARATUS, METHOD AND COMPUTER PROGRAM PRODUCT FOR PROCESSING EMAIL, AND APPARATUS FOR SEARCHING EMAIL

CROSS-REFERENCE TO RELATED APPLICATIONS

This application is based upon and claims the benefit of priority from the prior Japanese Patent Application No. 2007-212446, filed on Aug. 16, 2007; the entire contents of which are incorporated herein by reference.

BACKGROUND OF THE INVENTION

1. Field of the Invention

The present invention relates to an apparatus, a method and a computer program product for processing email, and an apparatus for searching email that set search conditions for searching an email document.

2. Description of the Related Art

Conventionally, email applications are widely used by users to transmit, receive, and view emails. Many of these email applications include functions for searching emails stored in a storage unit such as a hard disk.

Many email search functions of conventional email applications can search for a target email using, in addition to keywords, attribute information such as reception time, size, email addresses of sender and recipient, and whether a file is attached, as search conditions.

Recently however, with the proliferation of networking and developments in computer technology, there is a tendency towards increasing the capacity of emails saved by users in applications. Email search functions are consequently becoming important.

In conventional email search functions, when a large amount of emails are saved in an email application, unless the user sets appropriate keywords and attribute information as the search conditions, a large amount of emails will be detected as search results. To detect his target email, the user must therefore perform an appropriate sort and the like based on the reception time, email address of the sender, email title, and so on, leading to a problem that it takes a long time to detect the target email.

To avoid such problems, when searching for an email, the user must set search conditions for obtaining a smaller number of search results. However, to set appropriate keywords and appropriate attribute information, he must remember the specific type of the email, or repeat by trial and error until he can set appropriate keywords and attribute information. This leads to a problem, because setting the search conditions is troublesome and time-consuming.

A technique disclosed in JP-A 2004-355166 (KOKAI) maintains a database for storing keywords, and narrows down additional keywords used in a search by referring to this database. An email is searched for using the keywords and additional keywords. This can prevent a large amount of emails from being detected.

However, the technique disclosed in JP-A 2004-355166 (KOKAI) has a problem such that, because relativity between a specified document and a document that is the search target is unclear, it is not known whether the document that is the search target contains the detected additional keywords. Moreover, this search technique is not specialized for email searches.

SUMMARY OF THE INVENTION

According to one aspect of the present invention, an email processing apparatus includes a category determining unit configured to determine a content category of an email, from at least one of a main body of the email and a subject of the email stored in an email storage unit; a specifying unit configured to specify a search target category to which the search target email relating to the email belongs, based on the content category determined by the category determining unit; a acquiring unit configured to acquire search target information for searching for the search target email belonging to the search target category; and a creating unit configured to create a search condition for searching for the search target email that contains the search target information and belongs to the search target category, from the email storage unit.

According to another aspect of the present invention, an email search apparatus includes an email storage unit configured to store emails; a category determining unit configured to determine a content category of the email, from at least one of a main body of the email and a subject of the email stored in the email storage unit; a specifying unit configured to specify a search target category to which the search target email relating to the email belongs, based on the content category determined by the category determining unit; a acquiring unit configured to acquire search target information for searching for the search target email belonging to the search target category; a creating unit configured to create a search condition for searching for the search target email that contains the search target information and belongs to the search target category, from the email storage unit; and a search unit configured to search for an email containing the search condition from the email storage unit.

According to still another aspect of the present invention, an email processing method includes determining a content category of an email, from at least one of a main body of the email and a subject of the email stored in an email storage unit; specifying a search target category to which the search target email relating to the email belongs, based on the content category; acquiring search target information for searching for the search target email belonging to the search target category; and creating a search condition for searching for a search target email containing the search target information and belongs to the search target category, from the email storage unit.

A computer program product according to still another aspect of the present invention causes a computer to perform the method according to the present invention.

BRIEF DESCRIPTION OF THE DRAWINGS

FIG. 2 is a list of examples of meaning attributes;

FIG. 3 is a list of examples of category types;

FIG. 4 is a table configuration of a meaning-attribute-determining-information storage unit;

FIG. 5 is a table configuration of a category-determination-information storage unit;

FIG. 6 is a table configuration of an email-category-correspondence storage unit;

FIG. 7 is a table configuration of a search-phrase storage unit;

FIG. 8 is a table configuration of a search-history storage unit;

FIG. 9 is a flowchart of an overall process procedure in an email processing apparatus according to the first embodiment;

DETAILED DESCRIPTION OF THE INVENTION

Exemplary embodiments of an apparatus, a method and a computer program product for processing email, and an apparatus for searching email according to the present invention will be explained below in detail with reference to the accompanying drawings.

Figure 1:
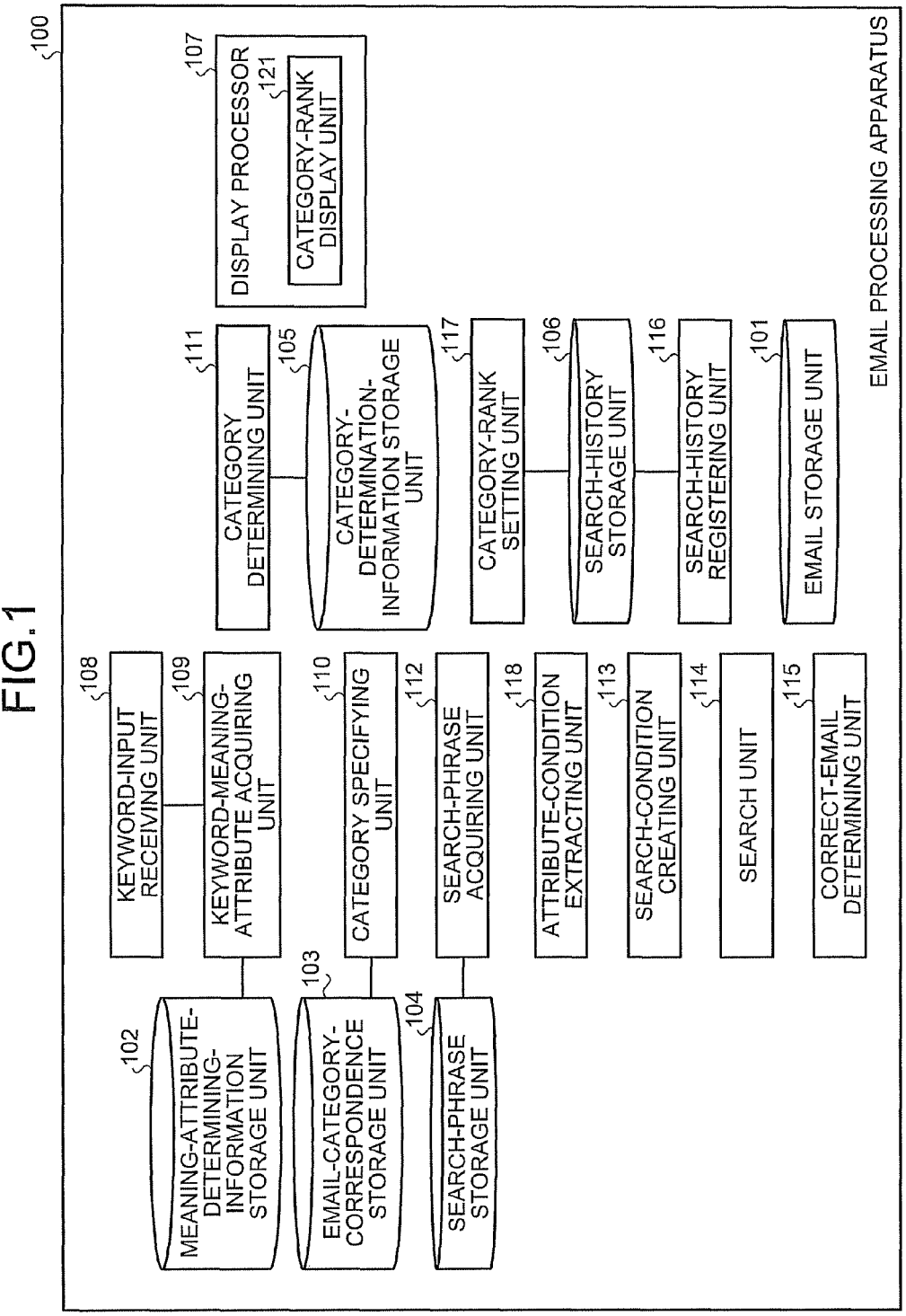
FIG. 1 is a block diagram of the configuration of an email processing apparatus according to a first embodiment.

As shown in FIG. 1, an email processing apparatus 100 according to a first embodiment of the present invention includes an email storage unit 101, a meaning-attribute-determining-information storage unit 102, an email-category-correspondence storage unit 103, a search-phrase storage unit 104, a category-determination-information storage unit 105, a search-history storage unit 106, a display processor 107, a keyword-input receiving unit 108, a keyword-meaning-attribute acquiring unit 109, a category specifying unit 110, a category determining unit 111, a search-phrase acquiring unit 112, a search-condition creating unit 113, a search unit 114, a correct-email determining unit 115, a search-history registering unit 116, and a category-rank setting unit 117.

When searching for an email, the email processing apparatus 100 according to the first embodiment determines meaning attributes of keywords input by a user, and a category type of a displayed email.

Meaning attributes indicate attributes obtained by abstracting keywords input by the user. As shown in FIG. 2, meaning attributes include name, email address, product name or the like. For example, if a user inputs 'Ono' and 'Nakamura' as keywords, the meaning attribute is 'Name'. Meaning attributes are not limited to those in the example of FIG. 2. A procedure for determining meaning attributes from input keywords is explained later.

Category types are obtained by categorizing email contents. As shown in FIG. 3, category types include request, request for permission/approval, question, reply or the like. A procedure for determining email category types is explained later. Category types are not limited to those in the example of FIG. 3.

Because emails are often (short) documents written to inform another person of a particular matter, with one email describing one point, their category types can be determined more easily than those of other documents.

The email processing apparatus 100 specifies a category type that is the search target from determined meaning attributes and determined category types, and creates search conditions in compliance with the specified category type. The constituent elements of the email processing apparatus 100 will be explained.

The email storage unit 101 stores emails transmitted and received by a user. Emails stored in the email storage unit 101 become search targets or display targets.

The meaning-attribute-determining-information storage unit 102 stores information for specifying meaning attributes from keywords input by the user. As shown in FIG. 4, the meaning-attribute-determining-information storage unit 102 stores 'character string patterns' that should be included in input keywords in correspondence with 'meaning attributes'. For example, in record 401 of FIG. 4, character string pattern 'Suzuki' is stored in correspondence with meaning attribute 'Name'.

Character string patterns sometimes contain variables, as in records 402, 403, 404, 405, and so on. For example, the pattern '%kanji%' in record 402 matches one arbitrary character, the pattern '%katakana%' in record 403 pattern one arbitrary katakana, and the patterns '%alphabet%' '%number%' and '%symbol%' in record 404 match one alphabet letter, one number, and one symbol. The plus symbol '+' in records 402 to 405 matches a repetition of one or more of an anterior pattern. The large brackets '[ ]' in records 404 and 405 match one of the characters they enclose.

By the meaning-attribute-determining-information storage unit 102, the keyword-meaning-attribute acquiring unit 109 described later can determine meaning attributes of input keywords.

The category-determination-information storage unit 105 stores information for determining the category type of a displayed email. As shown in FIG. 5, the category-determination-information storage unit 105 stores character string patterns, position specifications, category types, and points in correspondence together. A character string stored in this character string pattern is used in determining the category. A category type indicates the category type of the displayed email. A position specification indicates the position of a main text or a subject.

For example, record 601 indicates that, when the 'Main text' of the email includes a character string pattern 'There is a question', 1 point is added to the category type 'Question' of the email.

The email-category-correspondence storage unit 103 holds information for specifying, from among the category type and the like indicating content of a displayed email, a category of an email stored in the email storage unit 101 that is also the category type of the email that is the search target.

As shown in FIG. 6, the email-category-correspondence storage unit 103 stores meaning attributes in correspondence with displayed email category types and search target category types. Meaning attributes indicate the meaning attributes of keywords. Displayed email category types indicate category types of displayed emails. Search target category types indicate category types of search target emails. For example, record 501 of FIG. 6 stores meaning attribute 'Product Name' in correspondence with displayed email category type 'Question', search target email category types 'Evaluation, Solicitation, Order, Contract, and Reply'. That is, when the keyword input by a user has a meaning attribute of 'Product Name' and the category type of the displayed email is 'Question', the category types of the search target email are specified as 'Evaluation, Solicitation, Order, Contract, and Reply'.

The reason that category types of displayed emails and category types of search target emails are stored in correspondence together is that, when a user searches for an email while viewing an email, there is often relativity between the email being viewed and the search target email. For example, when the user is referring to a question email from a client, to write a reply email to that question email he often searches for a reply email he wrote previously for reference. When viewing a complaint email, to write a reply email to that complaint email, he often tries to search for an apology email he wrote previously.

Accordingly, in the email processing apparatus 100 according to the first embodiment, category types of contents of displayed emails are stored in correspondence with category types of search target emails.

Further, in the email-category-correspondence storage unit 103, meaning attributes of keywords are further corresponded. This arrangement enables the category types of search target emails to be further narrowed down.

As shown in FIG. 7, the search-phrase storage unit 104 stores category types in correspondence with phrases. The category types are those of search target emails. The phrases are character strings set as search keys (search conditions) when searching for emails of the corresponding category types.

The search-history storage unit 106 stores results of email searches by the user as histories. As shown in FIG. 8, the search-history storage unit 106 stores keywords, meaning attributes, category types of emails being viewed, category types of search target emails, and amended email attributes in correspondence together.

The keywords are input by the user when searching. The amended email attributes are email attributes desired by the user as a search target when searching.

The display processor 107 includes a category-rank display unit 121, and displays various information such as transmitted/received emails, a list of emails obtained as search results, and categories of searched emails. A specific example of a displayed screen is explained later.

The display processor 107 displays various types of search conditions used in searching on a search result display screen.

The category-rank display unit 121 displays candidates for category types of a search target email before performing a search. This enables category types for use in the search to be selected from the displayed candidates for category types. A specific example of a displayed screen is explained later.

The keyword-input receiving unit 108 receives input of keywords used for searching emails from the user.

The keyword-meaning-attribute acquiring unit 109 uses the meaning-attribute-determining-information storage unit 102 to obtain, from a keyword input by the keyword-input receiving unit 108, meaning attributes of that keyword. When a character string in an input keyword matches a character string stored in the 'Character string pattern' field of the meaning-attribute-determining-information storage unit 102, the meaning attributes stored in the 'Meaning attributes' field corresponding to the 'Character string pattern' field are obtained as meaning attributes of the input keyword.

The category determining unit 111 reads the main text and subject of an email (being viewed by a user) that is currently displayed in the display processor 107, and performs a determination process of that email using the category-determination-information storage unit 105 with respect to at least one of the main text and the subject of the read email. A detailed procedure for determining the email category is explained later.

Based on the category type of an email being displayed and meaning attributes of the keyword input by the user, the category specifying unit 110 specifies a category type which is the category type of the search target relating to emails of that category type and also corresponds to those meaning attributes, from the email-category-correspondence storage unit 103. The specified category type becomes a candidate for a category that the search target email belongs to.

That is, when the category type of an email determined by the category determining unit 111 matches the 'Displayed email category type' field in the email-category-correspondence storage unit 103, and there is a record whose 'Meaning attribute' field matches the meaning attribute determined by the keyword-meaning-attribute acquiring unit 109, the category specifying unit 110 obtains the category type stored in the 'Search target email category type' field of that record. The obtained category type becomes a candidate for a category type of a search target email. When there is one candidate for a category type of a search target email, that candidate is specified as the category type of the search target email.

When there is a plurality of candidates for specified category type, the category-rank display unit 121 display-processes the candidates for that category type, and the category specifying unit 110 specifies a category type selected from the displayed category types as the category type of the search target email.

When there a plurality of category types are specified by the category specifying unit 110, the category-rank setting unit 117 sets the category types displayed as search targets in descending order of their frequency of being used as search targets, based on the user's search history stored in the search-history storage unit 106. The category-rank display unit 121 displays the candidates for category type in the order set by the category-rank setting unit 117.

From the search-phrase storage unit 104, the search-phrase acquiring unit 112 obtains, from the category type of the search target email specified by the category specifying unit 110, a phrase that becomes search target information for searching for emails of that category type. When the specified category type of the search target matches the 'Category type' field of the search-phrase storage unit 104, the character string stored in the 'Phrase' field corresponding to the 'Category type' field become the search condition.

An attribute-condition extracting unit 118 uses the category type of the search target email as a search key to search the search-history storage unit 106, and extracts attribute information of the email corresponding to the category type previously detected by the user. That is, the attribute-condition extracting unit 118 obtains attribute information that becomes search target information for searching for the search target email.

The search-condition creating unit 113 creates search conditions containing one or more of the input keyword, the obtained phrase, and the extracted email attribute condition. A detailed creation procedure is explained later.

Based on the search conditions created by the search-condition creating unit 113, the search unit 114 searches the emails stored in the email storage unit 101.

When the display processor 107 displays search result emails, the correct-email determining unit 115 monitors operations performed by the user, and determines whether the email that the display processor 107 displays to the user is his desired search target. A detailed determination procedure is explained later.

If the correct-email determining unit 115 determines that it is the desired email, the search-history registering unit 116 stores the keyword input by the user, the meaning attributes of the keyword, the category type of the displayed email, and the search target email category type in correspondence together in the search-history storage unit 106.

Overall process procedures of the email processing apparatus 100 shown in FIG. 1 will be explained with reference to FIG. 9.

Figure 10:
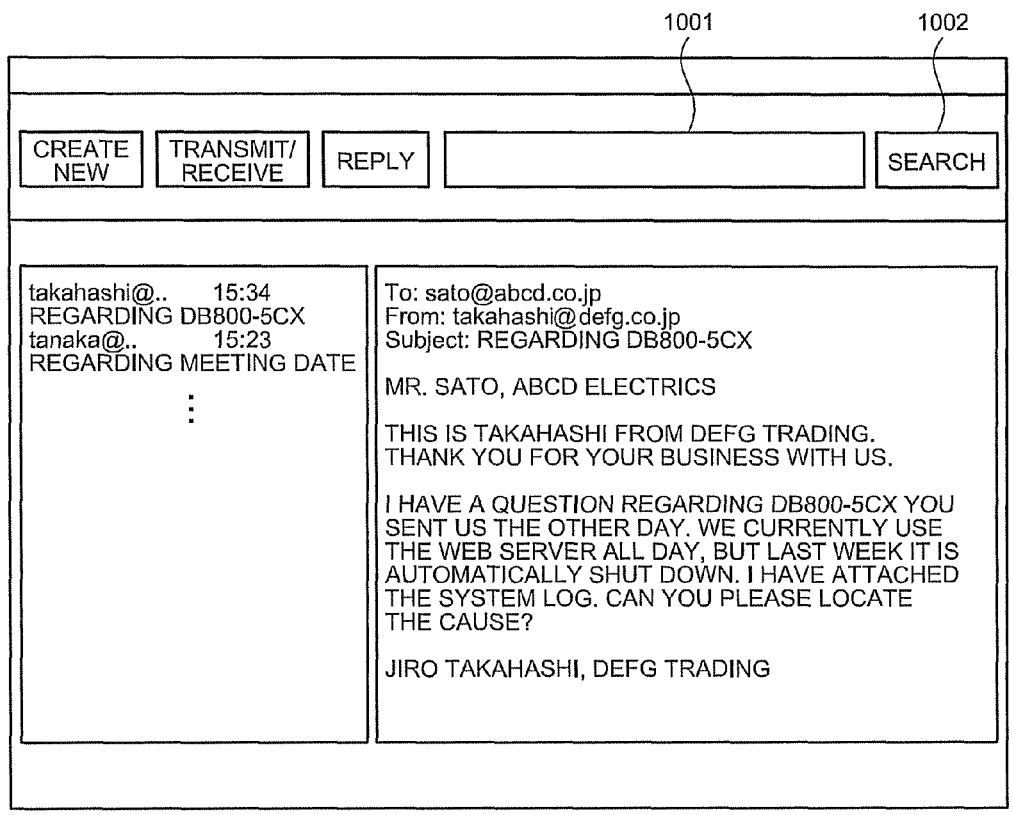
FIG. 10 is a diagram illustrating an example of a searchable email display screen.

As shown in the example screen of FIG. 10, it is assumed that the display processor 107 is displaying an email. When a character string is input to a text box 1001 and a search button 1002 is pressed, a search process is performed according to the process procedure shown in FIG. 9.

The keyword-input receiving unit 108 receives a keyword for use as a search key from the text box 1001 of FIG. 10 (step S901).

Consider a case where the user searches in the list of emails shown in the example screen of FIG. 10 for an email relating to a product that he previously created and transmitted himself. The email that is the search target contains a reply to a question email he previously received from another user in regard to a product named 'DB800-5CX'.

In this case, the user inputs 'DB800-5CX' as a search keyword to the text box 1001, and presses the search button 1002.

When the search button 1002 is pressed, the keyword-meaning-attribute acquiring unit 109 obtains a meaning attribute of the input keyword (step S902). A product name is obtained as the meaning attribute of 'DB800-5CX'. A detailed process procedure for the meaning attribute is explained later.

The category determining unit 111 determines the category type of the email being viewed by the user (being displayed by the display processor 107) (step S903). This category type determination procedure is explained later. It is determined here that the category type of the email displayed in the example screen of FIG. 10 is 'Question'.

The category specifying unit 110 searches the email-category-correspondence storage unit 103 using determined meaning attribute and category type as search keys, and specifies candidates for the category type of the search target email (step S904). This process procedure is explained in detail later.

As an example, when the email-category-correspondence storage unit 103 shown in FIG. 6 is searched using a meaning attribute of 'Product Name' and a displayed email category type of 'Question' as search keys, search target email category types of 'Evaluation, Solicitation, Order, Contract, and Reply' are specified as candidates for the category type of the search target email.

The category specifying unit 110 then determines whether there is a plurality of category type candidates (step S905). When it determines that there is not a plurality (NO at step S905), it specifies the specified category type candidate as the actual category type.

When the category specifying unit 110 determines that there is a plurality of category type candidates (YES at step S905), the category-rank setting unit 117 arranges the category type candidates in descending order of the frequency of their use as search targets, based on the search history of the user stored in the search-history storage unit 106 (step S906).

The category-rank display unit 121 displays the category type of the email that becomes the search target after arrangement (step S907).

Figure 11:
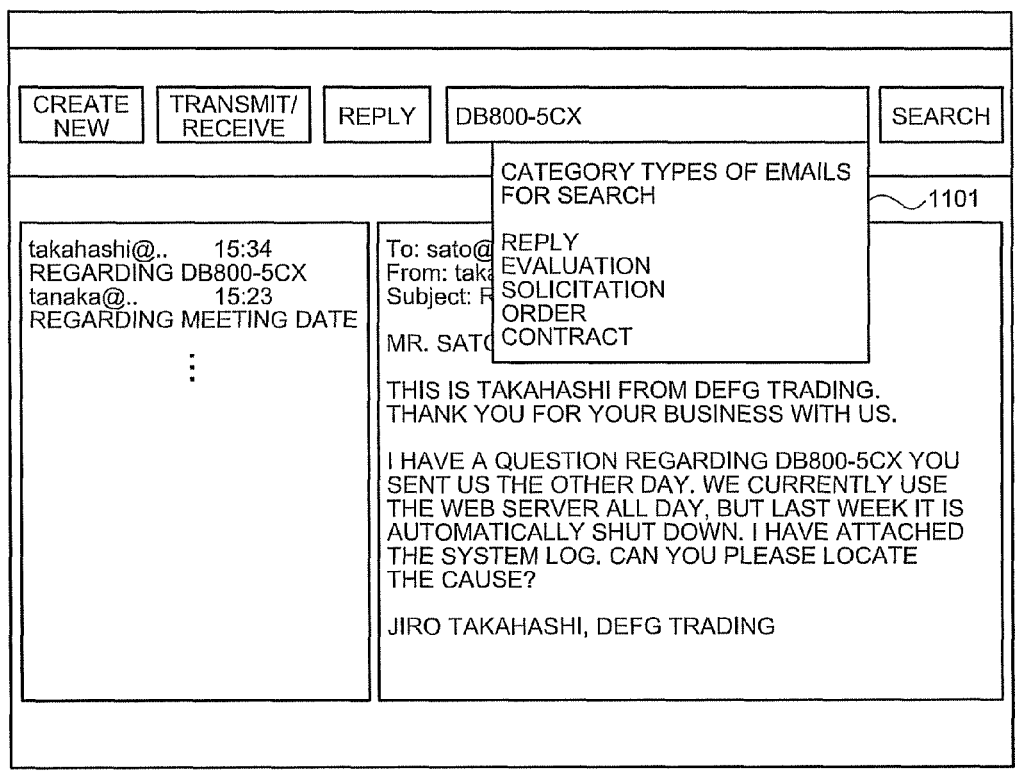
FIG. 11 is a diagram illustrating an example of a display screen of category type candidates for a search target email, displayed by a category-rank display unit.

As shown in FIG. 11, the category-rank display unit 121 displays the category type candidates in a pull-down menu. This enables the user to select an appropriate category type from the displayed candidates.

Returning to FIG. 9, the category specifying unit 110 specifies the candidate selected by the user as the category type of the search target email (step S908).

In the first embodiment, the user selects the category type 'Reply'. Based on this selection made by the user, the category specifying unit 110 specifies 'Reply' as the category type of the search target email.

The email processing apparatus 100 creates search conditions using the input keyword, the meaning attributes of the keyword, the category type of the search target email, and so on (step S909). A detailed process procedure for creating search conditions is explained later.

The search unit 114 performs a search using the search conditions created by the search-condition creating unit 113 (step S910).

The display processor 107 displays the result of the search made by the search unit 114 (step S911). In the example search result screen of FIG. 12, the keyword input by the user is set as a main keyword 1201, the category type of the displayed email is set as a viewed email 1202, the category type of the search target email is set as a search target email 1203, and a phrase corresponding to the category type of the search target email is set as an additional keyword 1204.

In this example, while the user can freely edit the display categories of the main keyword 1201 and the additional keyword 1204, he cannot directly change the display categories of the viewed email 1202 and the search target email 1203.

Attribute information such as 'Sender' and 'Destination' shown in a display region 1205 is extracted by the attribute-condition extracting unit 118. The user can freely edit the attribute information in the display region 1205.

When the attribute-condition extracting unit 118 extracts a plurality of pieces of attribute information, the display processor 107 can display the second and subsequent pieces of attribute information in a format that allows the user to select them.

Figures 12, 13:
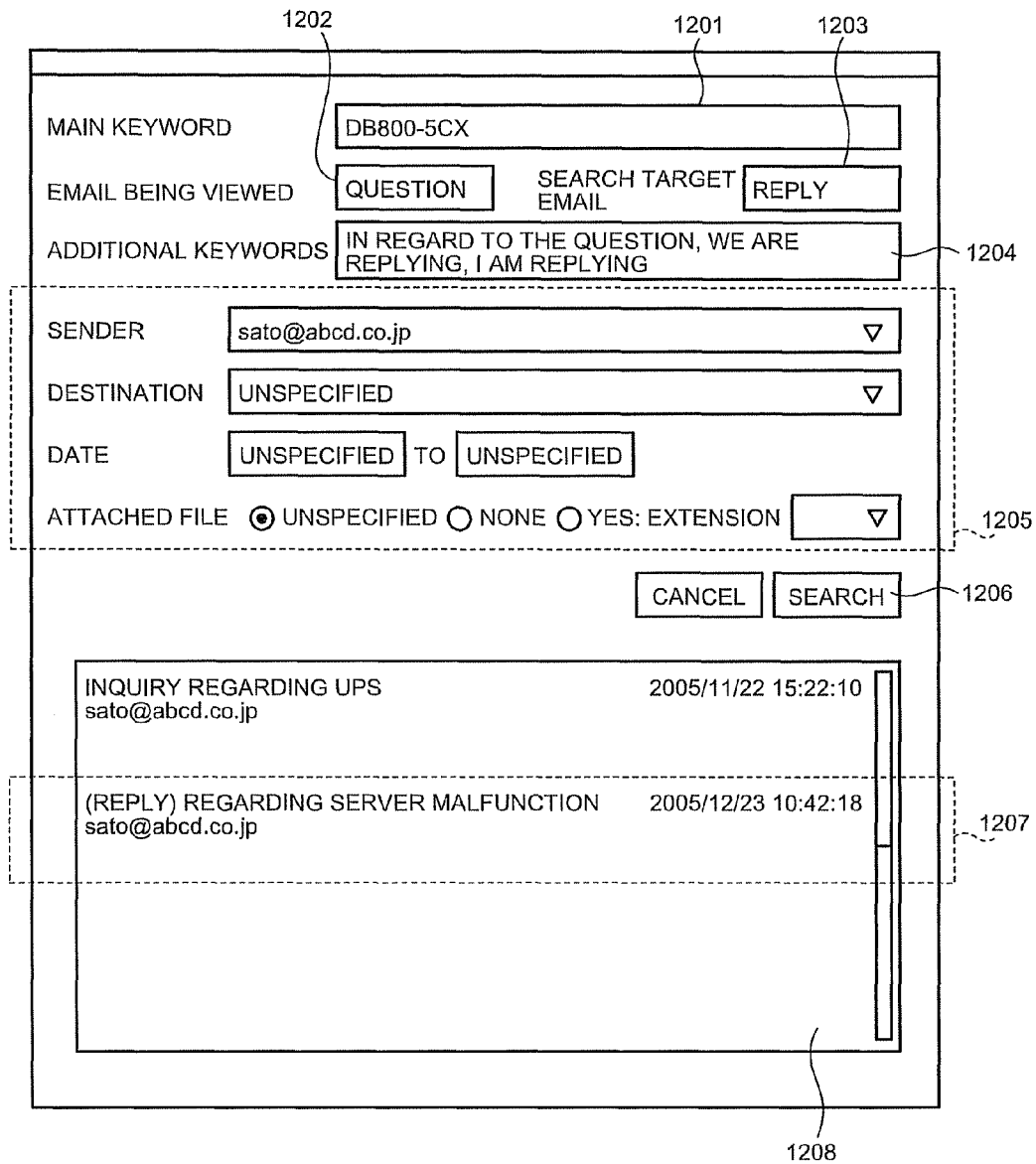
FIG. 12 is a diagram illustrating an example of a screen of search results displayed by a display processor.
FIG. 13 is a diagram illustrating an example of a plurality of pieces of attribute information that can be selected in a search result screen.

For example, if the attribute-condition extracting unit 118 extracts two email addresses for the 'Sender' entry, as shown in FIG. 13, the 'Sender' text box can be displayed with the two email address in a selectable format. This enables the user, when setting attribute information for use in a search, to select a piece of attribute information from the extracted ones.

When the user presses a search button 1206, search conditions are created based on the main keyword 1201, the additional keyword 1204, and the display region 1205 that are edited by the user, and a search is performed.

A list of searched emails is displayed in a display region 1208. This list displays not only the keywords input by the user, but also search results narrowed down by phrases and attribute information corresponding to the category type of the search target email. This enables the user to detect a desired email from a small quantity of search results.

If the search results do not contain his desired email, he can perform another search using different search conditions by deleting and amending the main keyword, the additional keyword, and the attribute information. This search result is displayed in the display region 1208.

When the user finds his desired email in the search results displayed in the display region 1208, he double-clicks on the region of that email, which is then displayed in a separate window.

Returning to FIG. 9, the search unit 114 determines whether the search button 1206 has been pressed (step S912). If it determines that the search button 1206 has been pressed (YES at step S912), it restarts the process from the creation of search conditions in compliance with the amended entries (step S909).

If the search button is not pressed (NO at step S912) and an email is selected from region 1208 of FIG. 12, the display processor 107 displays the category type of the selected email (step S913).

Figure 14:
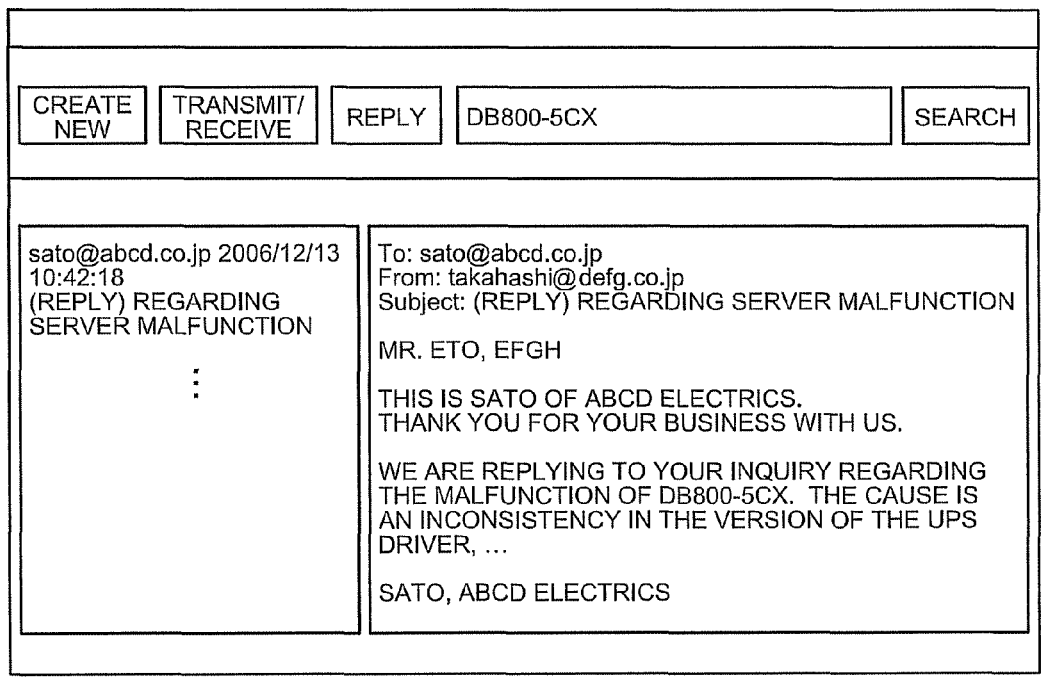
FIG. 14 is a diagram illustrating an example of a display screen displayed as a search result.

It is assumed that, in the search result screen of FIG. 12, the user double-clicks the email shown in region 1207. The display processor 107 displays the category of the email in a screen shown in FIG. 14.

Returning to FIG. 9, the correct-email determining unit 115 determines whether the displayed email is the one desired by the user as the search target (step S914). The process differs according to whether the correct-email determining unit 115 determines that it is the desired email (step S915).

When the correct-email determining unit 115 determines that it is not the desired email (NO at step S915), the search process is performed again (step S910). This can be performed from the process of displaying the search target email in step S913.

When the correct-email determining unit 115 determines that it is the desired email (YES at step S915), the search-history registering unit 116 stores the attribute information of the desired email, the input keyword, meaning attributes of that keyword, the category type of the displayed email, and the category type of the search target email in correspondence together in the search-history storage unit 106 (step S916).

According to this process, the user can create appropriate search conditions and perform a search merely by inputting a keyword and a category type. The search results are stored in the search-history storage unit 106, and are used in subsequent searches.

Figure 15:
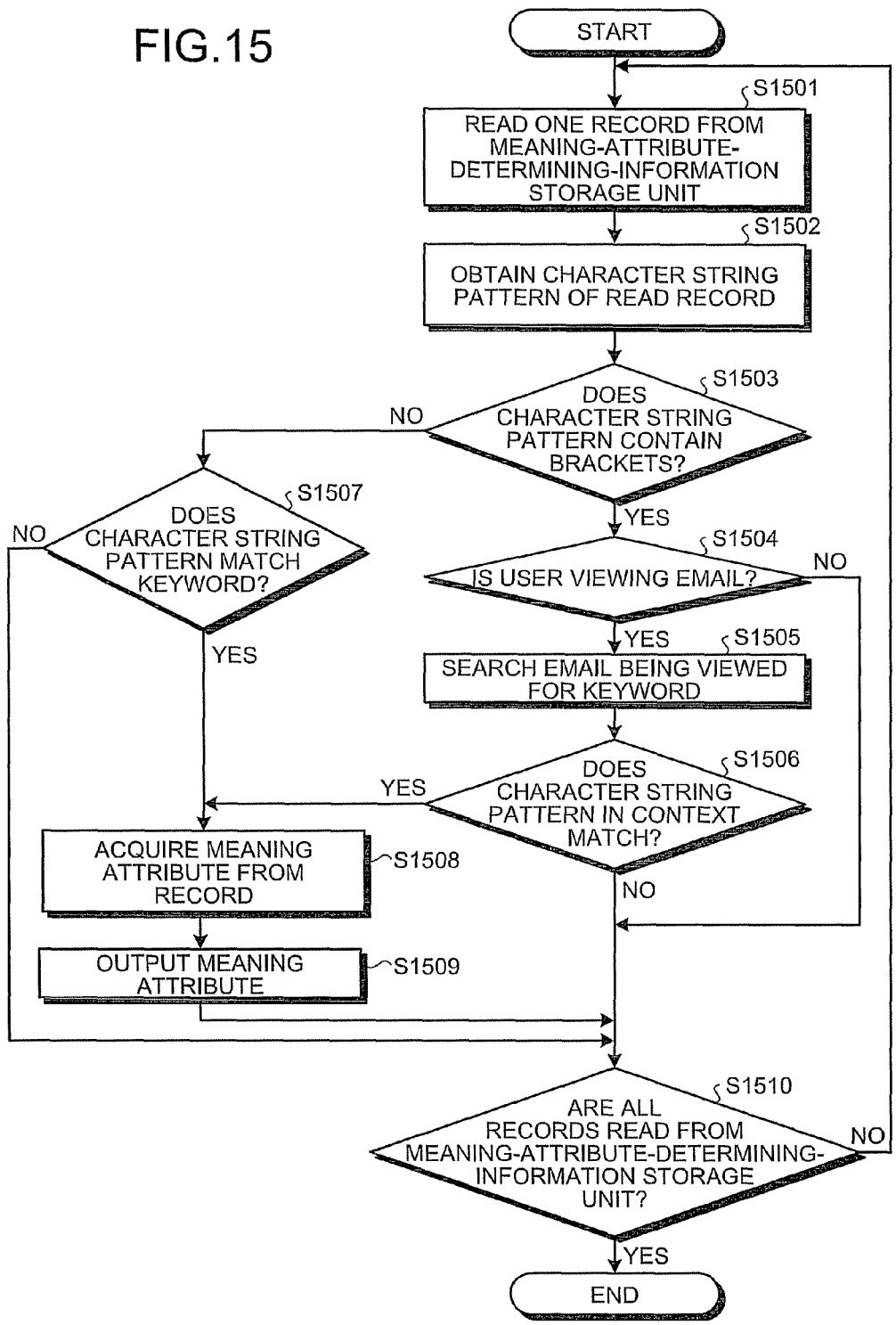
FIG. 15 is a flowchart of a meaning-attribute determining process performed by a keyword-meaning-attribute acquiring unit.

A procedure for obtaining meaning attributes of a keyword performed by the keyword-meaning-attribute acquiring unit 109 in step S902 of FIG. 9 will be explained with reference to FIG. 15.

First, the keyword-meaning-attribute acquiring unit 109 reads one record from the meaning-attribute-determining-information storage unit 102 (step S1501).

The keyword-meaning-attribute acquiring unit 109 then obtains a character string pattern of the read record (step S1502).

The keyword-meaning-attribute acquiring unit 109 determines whether the read character string pattern contains brackets '( )' (step S1503).

When the keyword-meaning-attribute acquiring unit 109 determines that the character string pattern contains no brackets (YES at step S1503), it determines whether the user is viewing the email (step S1504). Specifically, it determines whether the email is being displayed as in the example screen of FIG. 10. If email applications and the constituent elements for creating search conditions are configured separately, as in a second embodiment of the present invention described later, it determines whether the email is being displayed while an application is selected. When it determines that the email is not being viewed (NO at step S1504), no particular process is performed.

When the keyword-meaning-attribute acquiring unit 109 determines that the email is being viewed (YES at step S1504), it searches the email being viewed for a character string region that matches the keyword (step S1505). The keyword-meaning-attribute acquiring unit 109 then determines whether a combination of the detected character string region and the preceding and subsequent character strings matches a character string formed by replacing the portion of the character string pattern enclosed by the brackets with the keyword (step S1506). Rather than invariably replacing the portion of the character string pattern enclosed by the brackets with the keyword, the keyword-meaning-attribute acquiring unit 109 only replaces it when the condition displayed in the bracketed portion matches the keyword. When no keyword replacement is made, it determines that there is no match (NO at step S1506).

An example of determining whether there is a match will be explained. In the case of a record denoted by reference code 402 in FIG. 4, because the character string pattern contains brackets, it is determined whether a character string in the email being viewed satisfies the conditions of the character string pattern. If the keyword includes one or more characters and is written after a character string 'Corporation' in the email being viewed, this is determined as matching the character string pattern.

In the case of a record denoted by reference code 403 in FIG. 4, if the email being viewed contains a character string that includes one or more katakana and contains the character string 'Trading' after the keyword, this is determined as matching the character string pattern.

In the case of a record denoted by reference code 405 in FIG. 4, if the email being viewed contains a character string whose meaning attribute is determined as 'Corporate/Institutional Name' in an arbitrary meaning-attribute-determining-information storage unit 102, followed by the keyword inside the brackets, it is determined that this matches the character string pattern.

When the keyword-meaning-attribute acquiring unit 109 determines that there is no match (NO at step S1506), no particular process is performed.

When the keyword-meaning-attribute acquiring unit 109 determines that the character string pattern does not contain brackets (NO at step S1503), it determines whether the character string pattern matches the keyword (step S1507). For example, if it is a simple character string (e.g., 'Suzuki') such as that indicated by reference code 401 in FIG. 4, the determination is whether the keyword matches that character string. When the keyword-meaning-attribute acquiring unit 109 determines that there is no match (NO at step S1507), no particular process is performed.

When the keyword-meaning-attribute acquiring unit 109 determines that the character string pattern matches the keyword (YES at step S1507), or when it determines that the combination of the detected character string region and the preceding and subsequent character strings matches a character string formed by replacing the portion of the character string pattern enclosed by the brackets with the keyword (YES at step S1506), it acquires the character string stored in the 'Meaning Attribute' field of that record (step S1508).

The keyword-meaning-attribute acquiring unit 109 outputs the acquired character string as a meaning attribute (step S1509). This enables the constituent elements of the email processing apparatus 100 to identify the meaning attribute.

The keyword-meaning-attribute acquiring unit 109 then determines whether all records have been read from the meaning-attribute-determining-information storage unit 102 (step S1510). When it determines that all records have not been read (No at step S1510), it starts the process again from step S1501.

When the keyword-meaning-attribute acquiring unit 109 determines that all records have been read (YES at step S1510), it ends the process.

The meaning attribute of a keyword can be determined by performing the above process. For example, if the keyword is 'DB800-5CX', because this matches the character string pattern of record 404 in FIG. 4, the meaning attribute is determined to be 'Product Name'.

Figure 16:
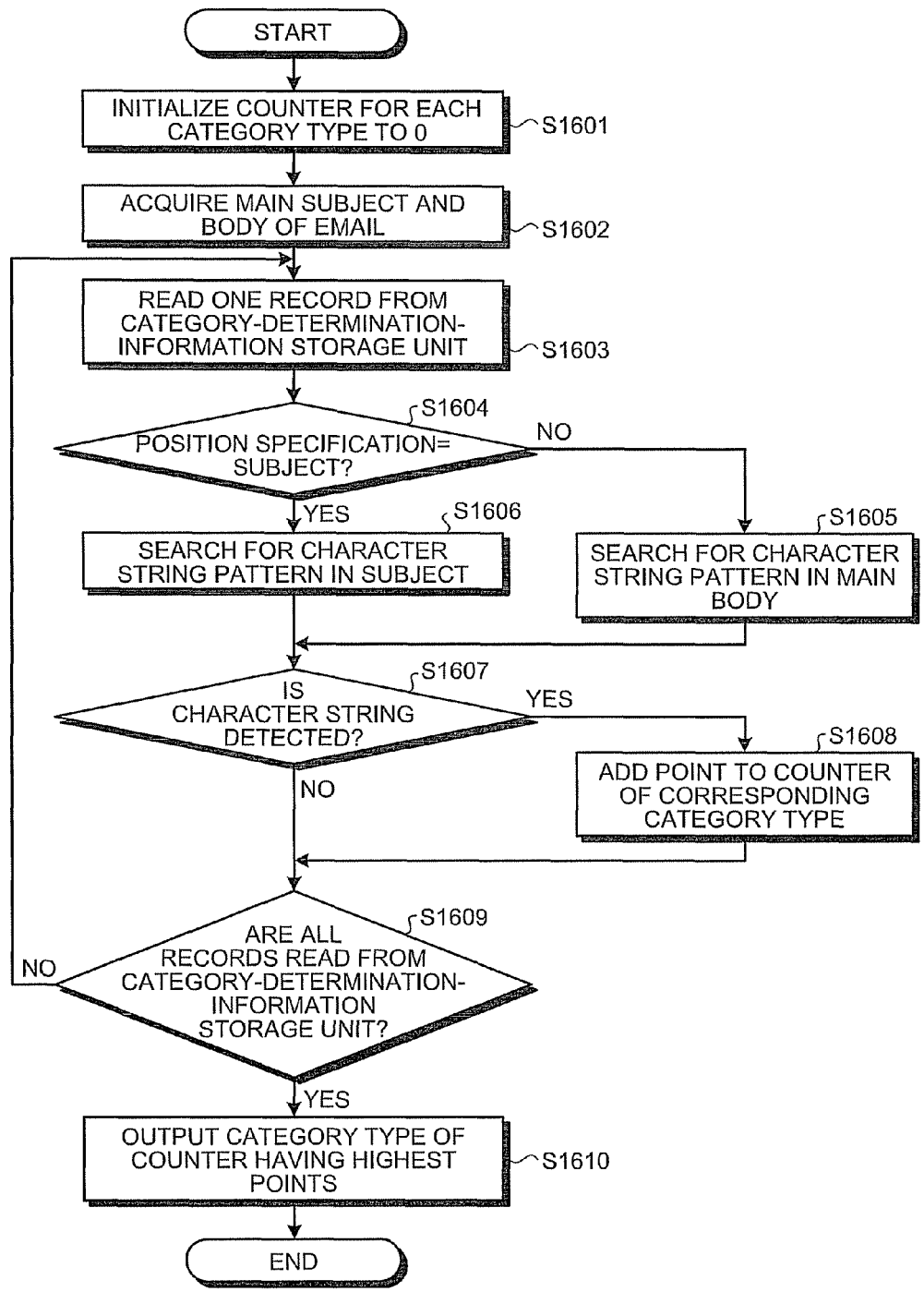
FIG. 16 is a flowchart of a category-type determining process of a displayed email performed by a category determining unit.

A process procedure for determining the category type of an email being viewed, performed by the category determining unit 111 in step S903 of FIG. 9, will be explained with reference to FIG. 16.

The category determining unit 111 initializes counters for each category type by setting them to '0' (step S1601). A counter is provided for each category type shown in FIG. 3, and each counter value is set to '0'.

The category determining unit 111 acquires a subject and a main body of the email being displayed (step S1602).

The category determining unit 111 then acquires one record from the category-determination-information storage unit 105 (step S1603).

The category determining unit 111 determines whether the 'Position Specification' field of the acquired record is the subject (step S1604). When it determines that the 'Position Specification' is the subject (YES at step S1604), it searches for a character string stored in the 'Character string Pattern' field of the record in the subject of the email (step S1606).

When the category determining unit 111 determines that the 'Position Specification' field of the acquired record is not the subject (NO at step S1604), it searches for a character string stored in the 'Character string Pattern' field of the record in the main body of the email (step S1605).

The category determining unit 111 then determines whether a character string is detected in step S1605 and step S1606 (step S1607). If it determines that none is detected (step S1607), no particular process is performed.

On the other hand, when the category determining unit 111 determines that a character string is detected (YES at step S1607), it adds the number of points written in the 'Points' field to the category type stored in the 'Category Type' field of the read record (step S1608).

The category determining unit 111 then determines whether all records stored in the category-determination-information storage unit 105 have been read (step S1609). If it determines that all records have not been read (NO at step S1609), the process is restarted from step S1603.

If the category determining unit 111 determines that all records have not been read (YES at step S1609), it outputs a category type corresponding to the category type counter having the highest number of points (step S1610).

As a result of this process procedure, the output category type is used as the category type of the email being viewed. For example, because the email shown in FIG. 10 contains the character string pattern shown in record 601 of FIG. 5, its category type is determined to be 'Question'.

Figure 17:
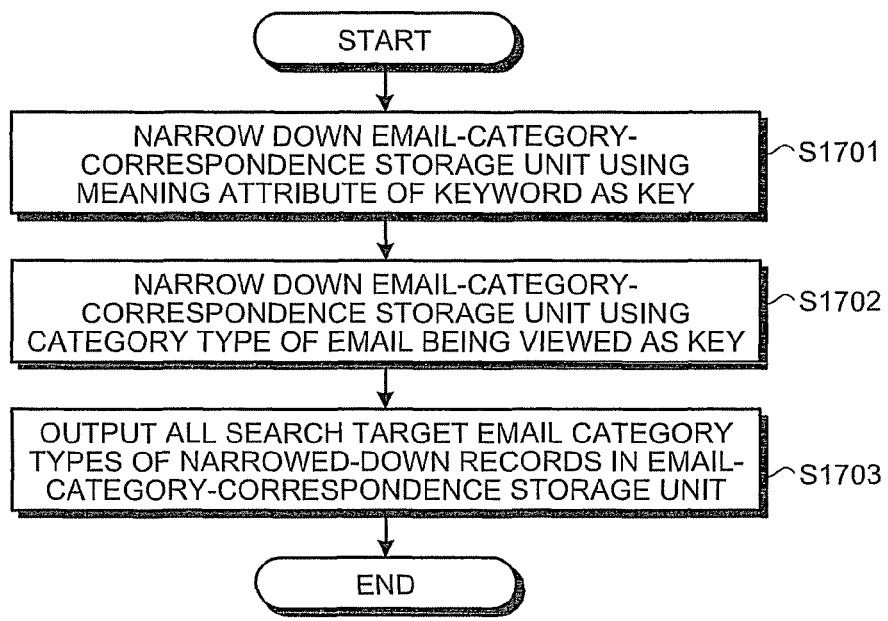
FIG. 17 is a flowchart of a category-type specifying process of a search target email performed by a category specifying unit.

A process procedure for specifying candidates for category types of a search target email, performed by the category specifying unit 110 in step S904 of FIG. 9, will be explained with reference to FIG. 17.

The category specifying unit 110 uses the meaning attribute of the keyword as a search key to narrow down the records of the email-category-correspondence storage unit 103 (step S1701).

The category specifying unit 110 further narrows down the records of the email-category-correspondence storage unit 103 using the category type of the email being viewed as a key (step S1702).

The category specifying unit 110 outputs all category types stored in the 'Search Target Email Category Type' fields of the narrowed-down records of the email-category-correspondence storage unit 103 (step S1703).

As a result of this process procedure, the output category types become candidates for the category type of the search target email. In the example of the email-category-correspondence storage unit 103 shown in FIG. 6, when the meaning attribute of the keyword is 'Product Name' and the category type of the viewed email is 'Question', candidates for the category type of the search target email obtained by this process procedure are 'Evaluation', 'Solicitation', 'Order', 'Contract', and 'Reply' shown in the record 501.

Figure 18:
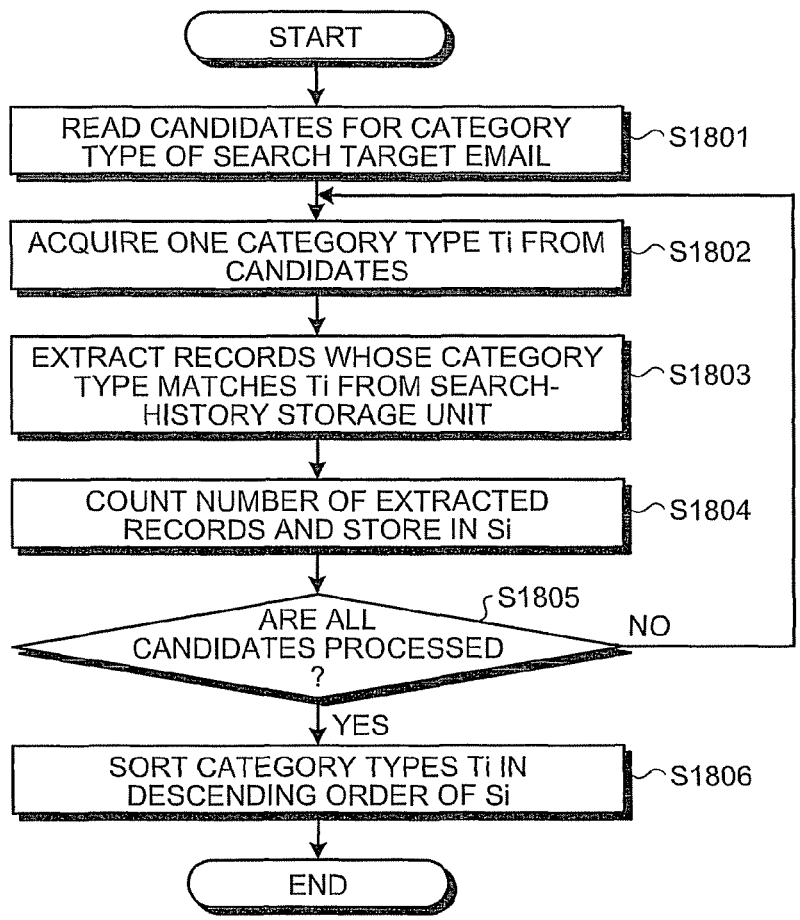
FIG. 18 is a flowchart of a category-type sorting process performed by a category-rank setting unit.

A process procedure for sorting the candidates for category type of the search target email, performed by the category-rank setting unit 117 in step S906 of FIG. 9, will be explained with reference to FIG. 18.

The category-rank setting unit 117 reads the candidates for category type of the search target email output by the category specifying unit 110 (step S1801).

The category-rank setting unit 117 acquires one category type Ti from the read candidates (step S1802). Category type Ti represents category type candidate number i. The variable i has an initial value of 1, and is increased by 1 every time the processes from step S1802 to S1805 are repeated.

The category-rank setting unit 117 extracts, from the search-history storage unit 106, records whose search target email category type matches the category type Ti from the search-history storage unit 106 (step S1803).

The category-rank setting unit 117 counts the number of extracted records, and stores it in the count number Si of that category type (step S1804).

The category-rank setting unit 117 determines whether the processes of steps S1802 to S1804 have been performed for all candidates for search target email category types that are read (step S1805). When it determines that they not been performed (NO at step S1805), the processes are restarted from step S1802.

When the category-rank setting unit 117 determines that processes have been performed for all candidates (YES at step S1805), it sorts the category types Ti in descending order of their count numbers Si (step S1806). This enables the category-rank display unit 121 to display the candidates for category types in descending order of usage frequency.

For example, when search history information is stored in the search-history storage unit 106 as in the example of FIG. 8, if the category types are 'Evaluation', 'Solicitation', 'Order', 'Contract', and 'Reply', the category-rank setting unit 117 sets the value of the count number Si of category type 'Evaluation' to 1, sets the values of the count numbers Si of category types 'Solicitation' 'Order' and 'Contract' to 0, and sets the value of the count number Si of category type 'Reply' to 3. The category-rank display unit 121 displays the category type candidates as shown in FIG. 11.

In this case, the category-rank setting unit 117 arranges the category type candidates in the order 'Reply', 'Evaluation', 'Solicitation', 'Order', 'Contract. While in this embodiment candidates having equal count number Si values are not sorted, they can be sorted by, for example, displaying recently selected category types at the top.

A process procedure of creating search conditions, performed by the search-condition creating unit 113 in step S909 of FIG. 9, will be explained with reference to FIG. 19.

The search-phrase acquiring unit 112 reads the category type of the search target email specified by the category specifying unit 110 (step S1901).

Using the category type c of the search target email that it read as a search key, the search-phrase acquiring unit 112 extracts records from the search-phrase storage unit 104 (step S1902).

When category type 'Reply' is extracted from the search-phrase storage unit 104 shown in FIG. 7, a record in which category type 'Reply' corresponds to the phrase 'I am (We are?) replying', and a record in which category type 'Reply' corresponds to the phrase 'Regarding that question', are extracted. Note that the phrase 'I am (We are?) replying' is developed into the phrases 'We are replying' and 'I am replying'.

The search-phrase acquiring unit 112 acquires one record from the extracted ones (step S1903), and acquires a phrase stored in the acquired record (step S1904).

The search-condition creating unit 113 encloses the acquired phrase in double-quotes (step S1905). When the processes of steps S1903 to S1905 are repeated and a plurality of phrases enclosed in double-quotes are created, the search-condition creating unit 113 connects the phrases enclosed in double-quotes with 'OR' (step S1906).

The search-phrase acquiring unit 112 determines whether the processes from step S1903 to S1906 have been performed for all extracted records (step S1907). If they have not (NO at step S1907), the processes is restarted from step S1903.

When the search-phrase acquiring unit 112 determines that all records have been processed (YES at step S1907), the search-condition creating unit 113 performs a process of enclosing the collection of phrases connected in the process of step S1906 in brackets (step S1908).

The search-condition creating unit 113 connects the collection of phrases enclosed in brackets and the keyword with 'AND' (step S1909).

For example, when the category type of the search target email is 'Reply', the search-condition creating unit 113 creates, from the search-phrase storage unit 104 of FIG. 7, a phrase collection of "('In regard to the question' OR 'We are replying' OR 'I am replying')". With 'DB800-5CX' as the keyword, it connects the created phrase collection with this keyword to obtain "'DB800-5CX' AND ('In regard to the question' OR 'We are replying' OR 'I am replying')", which becomes a first search condition.

The search unit 114 performs a search using the first search condition that is created, and acquires a number of search results (the number of emails that match the first search condition) N1 (step S1910). The search-condition creating unit 113 determines whether the number N1 of detected emails is 0 (step S1911). When the number of detected emails N1 is 0 (YES at step S1911), it nullifies the first search condition, and creates a second search condition consisting only of the input keyword; it then outputs this second search condition and processes it (step S1912). After the search, the user refers to emails containing the keyword as search results.

Meanwhile, the search-condition creating unit 113 determines whether the number of detected emails N1 is equal to or greater than 1, and smaller than a predetermined maximum number of detections M (step S1913).

When the search-condition creating unit 113 determines that the number of detected emails N1 is equal to or greater than 1 and smaller than the predetermined maximum number of detections M (YES at step S1913), it outputs the first search condition, and the process ends (step S1919). The user refers to the results searched according to the first search condition. The maximum number of detections M is set to an appropriate value corresponding to circumstances, such as the number of emails that the user wishes to refer to in one viewing.

On the other hand, when the search-condition creating unit 113 determines that the number of detected emails N1 exceeds the predetermined maximum number of detections M (NO at step S1913), the attribute-condition extracting unit 118 extracts email attribute information used as the search condition (step S1914). This process of extracting email attribute information is explained in detail later.

For example, if the predetermined maximum number of detections M=10, and the number of detected emails N1=34, the search-condition creating unit 113 commands the attribute-condition extracting unit 118 to extract email attribute information for narrowing down the search results.

The search-condition creating unit 113 connects the first search condition and the extracted attribute information with 'AND', and creates a third search condition (step S1915).

The search unit 114 performs a search according to the third search condition that is created, and the search-condition creating unit 113 acquires the number of search results (the number of emails that match the third search condition) N2 (step S1916).

The search-condition creating unit 113 determines whether the number of search results N2 is 0 (step S1917). When it determines that the number of search results N2 is 0 (YES at step S1917), it outputs the first search condition, and ends the process (step S1919).

On the other hand, when the search-condition creating unit 113 determines that the number of search results N2 is not 0 (NO at step S1917), it outputs the third search condition, and ends the process (step S1918).

Figure 19:
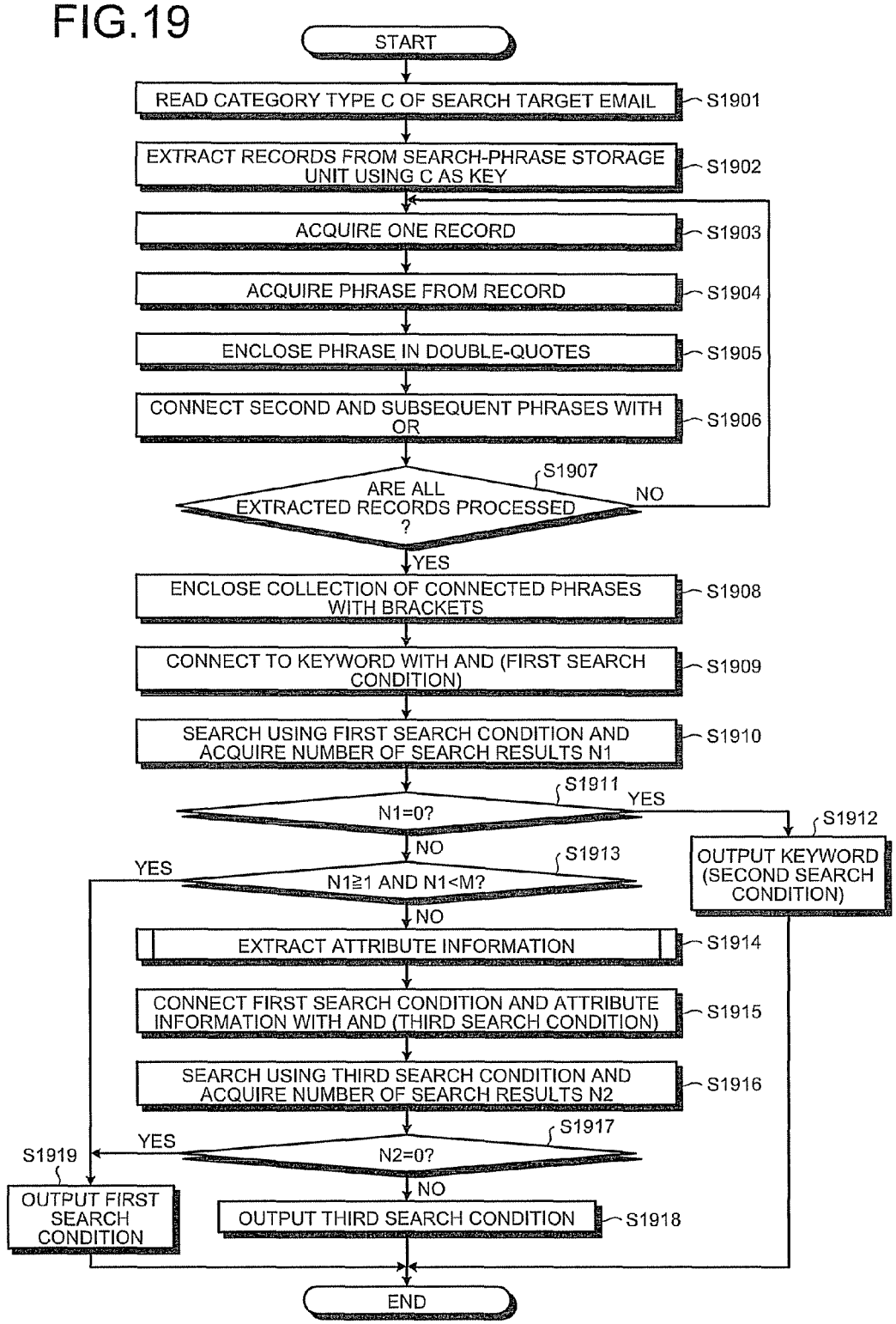
FIG. 19 is a flowchart of a search-condition creating process performed by a search-condition creating unit.

The method of defining search conditions shown in FIG. 19 is merely one example. For example, when performing a search in an email application such as in the second embodiment described later, creation of search conditions depends on the specification of the email application being used.

While in the second embodiment, the keyword and each phrase are connected with AND, this connection method is not limitative. For example, the keyword and each phrase can be connected with OR, or a search method different from a Boolean expression can be used.

Figure 20:
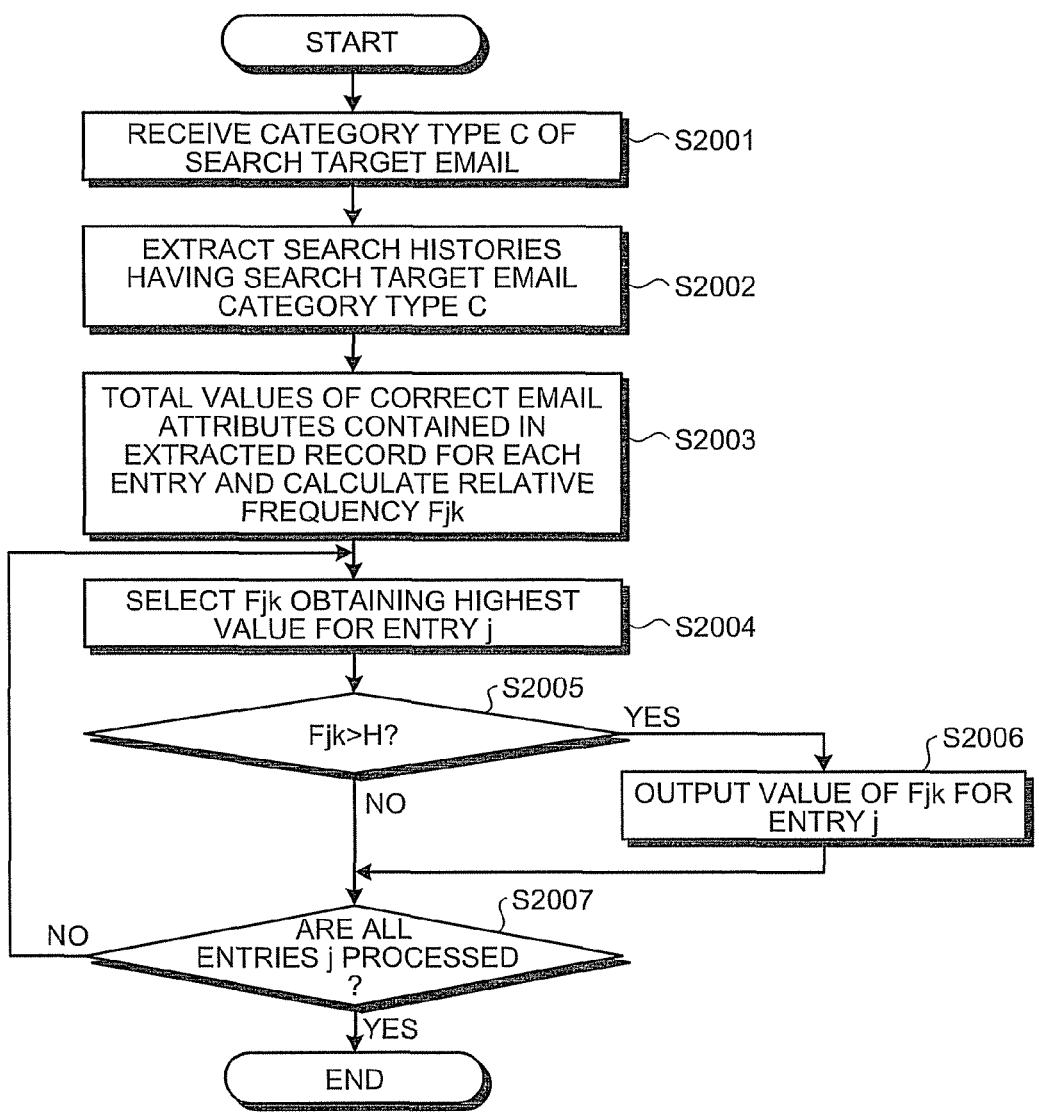
FIG. 20 is a flowchart of an attribute-information extracting process performed by an attribute-condition extracting unit.

A process procedure of extracting email attribute conditions, performed by the attribute-condition extracting unit 118 in step S1914 of FIG. 19, will be explained with reference to FIG. 20.

The attribute-condition extracting unit 118 receives a category type C of an email that is the search target from the search-condition creating unit 113 (step S2001).

The attribute-condition extracting unit 118 extracts, from the search-history storage unit 106, records whose 'Search Target Email Category Type' fields match the received category type (step S2002).

The attribute-condition extracting unit 118 calculates a relative frequency $F_{jk}$ of each entry of the correct email attribute of the extracted record ('Sender' 'Destination' 'Attached File' 'Attached File Extension'), except the date of transmission/reception (step S2003). Variable j represents each entry of the correct email attribute, and variable k represents a specific value of each entry. For example, if the entry is Sender, a specific value can be 'yokota@mnop.co.jp'.

If R is the number of extracted records, Rjk is the number of records whose entries have specific values. In this case, relative frequency Fjk is calculated as Fjk=Rjk/R.

The attribute-condition extracting unit 118 selects a relative frequency Fjk that obtains the highest value for each entry j (step S2004). The attribute-condition extracting unit 118 then determines whether the selected relative frequency Fjk is larger than a predetermined threshold value H. If it is not larger (NO at step S2005), no particular process is performed.

On the other hand, when it is larger (YES at step S2005), the attribute-condition extracting unit 118 outputs the specific value that calculated the relative frequency Fjk as an attribute condition for use as a search condition (step S2006).

The attribute-condition extracting unit 118 determines whether processes of steps S2004 to S2006 have been performed for all entries j (step S2007). If they have not (NO at step S2007), it starts processes from step S2004 for unprocessed entries j.

When the attribute-condition extracting unit 118 determines that all entries j have been processed by steps S2004 to S2006 (YES at step S2007), the process ends.

In the search-history storage unit 106 of FIG. 8, if entry C is 'Reply', the histories extracted in step S2002 are records 801, 802, 803, i.e. the number of records is 3.

When entry j='Sender' and the specific value k='sato@abcd.co.jp', Rjk=3. Therefore, in step S2003, the attribute-condition extracting unit 118 calculates the relative frequency Fjk=3/3=1.

When entry j='Attached File and the specific value k='None', Rjk=2. Therefore, in step S2003, the attribute-condition extracting unit 118 calculates the relative frequency Fjk=2/3=0.67.

If the threshold value H is set to 0.8, attached file=None is not extracted as attribute information for a search condition; instead, Sender=sato@abcd.co.jp is extracted as attribute information for the search condition.

As shown in step S1915 of FIG. 19, the search-condition creating unit 113 thereby creates a third search condition of "'DB800-5CX' AND ('In regard to the question' OR 'We are replying' OR 'I am replying') AND (from: sato@abcd.co.jp)". The processes of step S1915 and so on of FIG. 19 are then performed.

Figure 21:
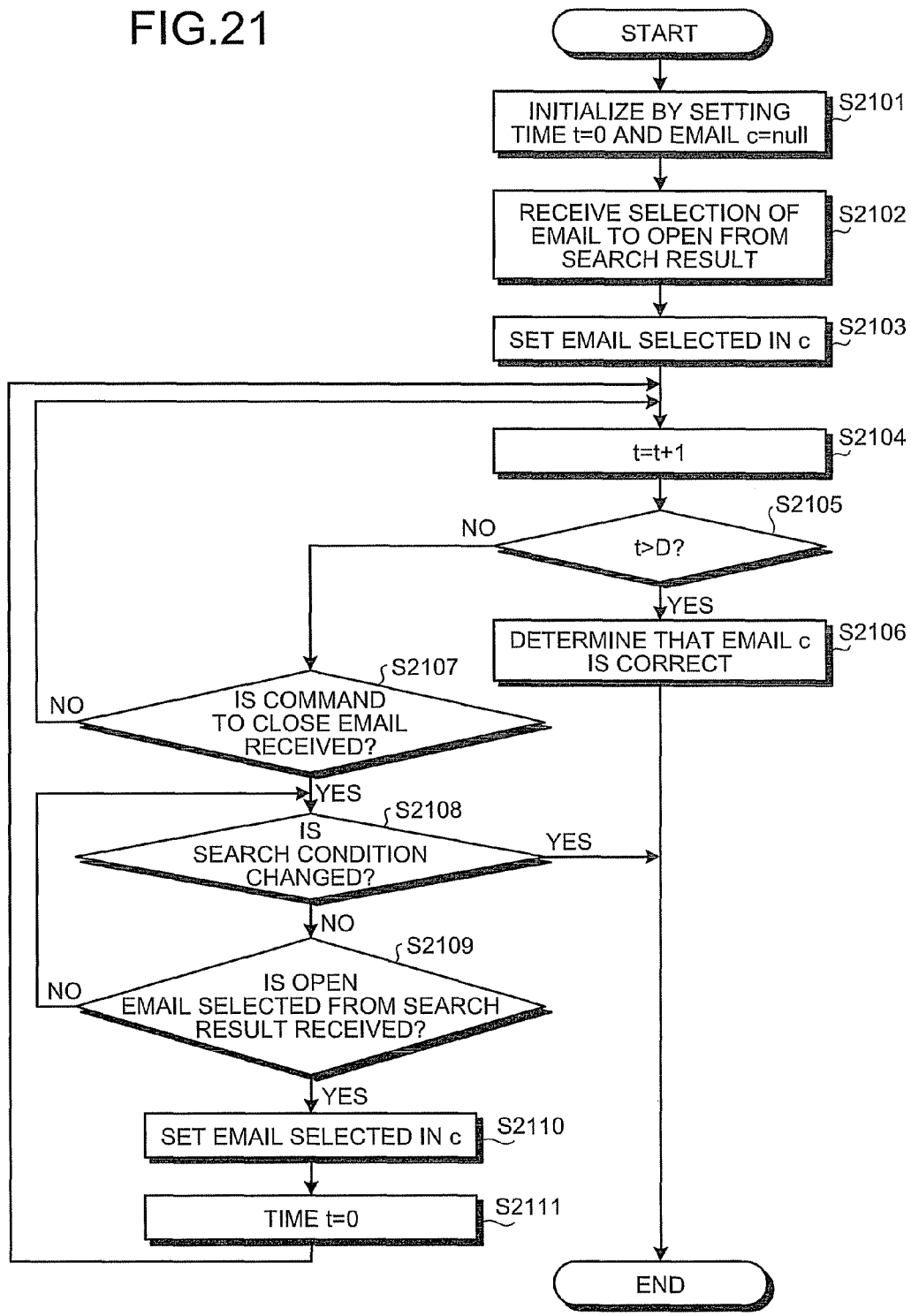
FIG. 21 is a flowchart of a process of determining whether an email is one desired by a user performed by a correct-email determining unit.

A process procedure of determining whether this is the email desired by the user, performed by the correct-email determining unit 115 in step S914 of FIG. 9, will be explained with reference to FIG. 21.

First, the correct-email determining unit 115 performs initialization by setting the timer variable t to 0, and setting the variable c that identifies emails viewed by the user to 'null' (step S2101).

The correct-email determining unit 115 then receives an email for opening from the list of search results (e.g., from region 1208 of FIG. 12) (step S2102). The correct-email determining unit 115 waits until an email for opening is selected.

The correct-email determining unit 115 sets the variable c to a value for identifying the selected email (step S2103).

The correct-email determining unit 115 then counts the time t (step S2104), and determines whether the time t is greater than a predetermined threshold value D (step S2105).

When the correct-email determining unit 115 determines that the time t is not greater than the predetermined threshold value D (NO at step S2105), it determines whether a command to close the email is received (step S2107). When it determines that no such command is received (NO at step S2107), counting the time t is restarted from step S2104.

On the other hand, when the correct-email determining unit 115 determines that a command to close the email is received (YES at step S2107), it determines whether the search condition has been changed in the search result screen of FIG. 12 (step S2108). If the search condition has been changed (YES at step S2108), the process by the correct-email determining unit 115 ends in order to perform another search.

When the correct-email determining unit 115 determines that the search condition is unchanged (NO at step S2108), it determines whether an open email is selected (step S2109). If no such selection is received, the process is started from step S2108.

When the correct-email determining unit 115 determines that an open email is selected from the search result screen (YES at step S2109), it sets the variable c to a value indicating the selected email (step S2110). The correct-email determining unit 115 then initializes the time t (step S2111).

When the correct-email determining unit 115 determines that the time t is greater than the predetermined threshold value H (YES at step S2105), it determines that mail c is the email desired by the user, and ends the process (step S2106).

According to the email processing apparatus 100 of the second embodiment, when the user inputs a keyword, the category type of the search target email is specified and a search condition is created in compliance with that category type, whereby search results that are narrowed-down according to an appropriate condition can be obtained. This eliminates setting of search conditions by the user, and troublesome steps for searching for his desired email, of the prior art. The time taken by the user to perform these operations can also be reduced.

According to the email processing apparatus of the second embodiment, by creating search conditions to search for an email corresponding to a displayed email, the operating load of the user who sets the search conditions can be reduced.

The first embodiment describes an example where email application functions and constituent elements for creating search conditions are provided together. However, the present invention is not limited to this configuration. An embodiment where the constituent elements for creating search conditions are configured separately from the email applications is explained next.

Figure 22:
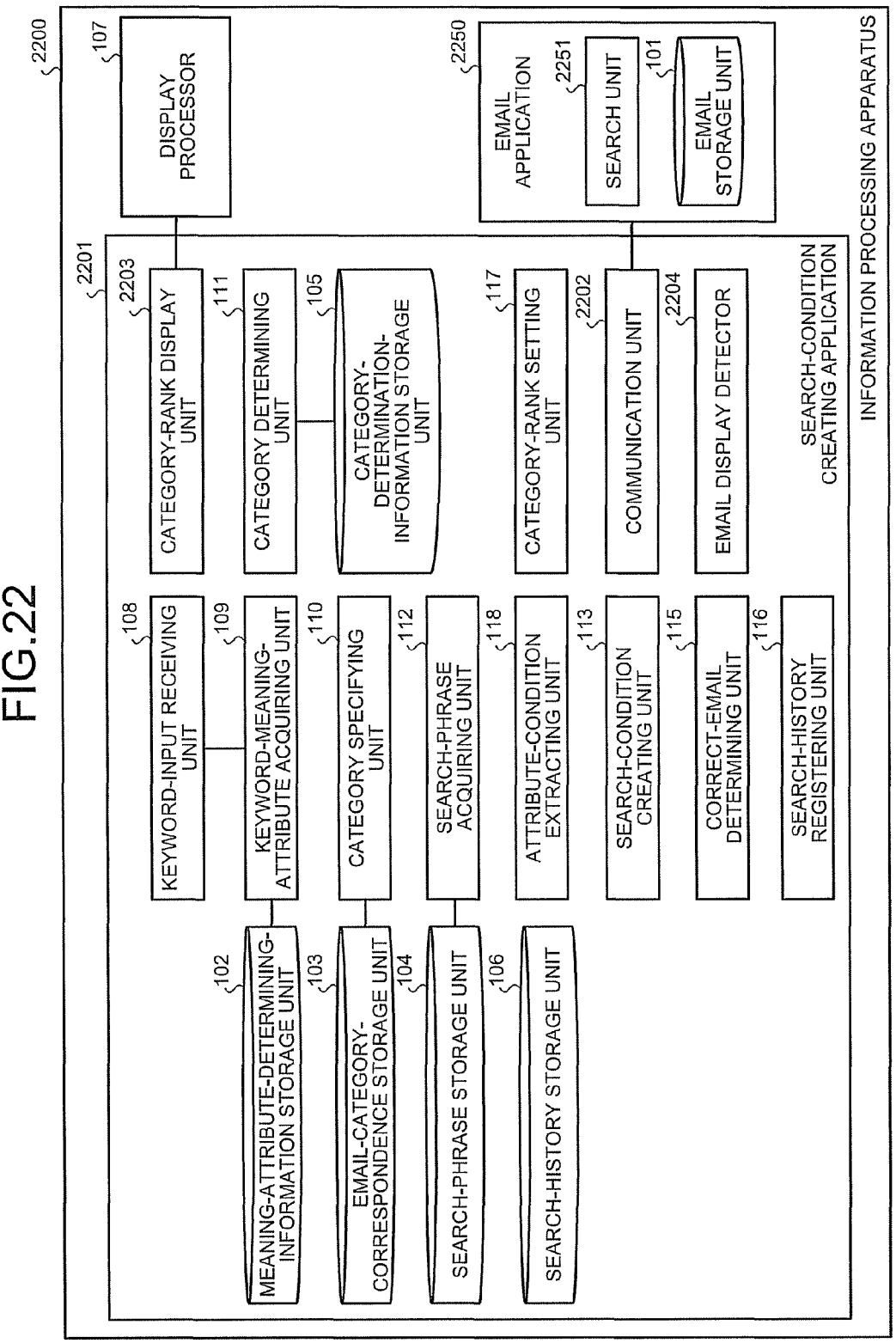
FIG. 22 is a block diagram of a configuration of an information processing apparatus according to a second embodiment.

FIG. 22 is a block diagram of the configuration of an information processing apparatus 2200 according to the second embodiment. The information processing apparatus 2200 shown in FIG. 22 includes the display processor 107, a search-condition creating application 2201, and an email application 2250. Constituent elements of the information processing apparatus 2200 according to the second embodiment that are common to those of the email processing apparatus 100 according to the first embodiment are denoted by like reference numerals, and explanations thereof will be omitted.

The email application 2250 includes the email storage unit 101 and a search unit 2251; it also includes functions for saving, viewing, and transmitting/receiving emails.

The search unit 2251 performs a search based on the search condition created by the search-condition creating application 2201. In this example, the search unit 2251 controls the search function in accordance with request from the search-condition creating application 2201.

The search-condition creating application 2201 is configured from the constituent elements of the email processing apparatus 100 according to the first embodiment, without the display processor 107 and the search unit 114, and with the addition of a category-rank display unit 2203, a communication unit 2202, and an email display detector 2204.

In the second embodiment, the search-condition creating application 2201 adds existing mechanisms known as add-in or plug-in and the like to an existing email application. If the search-condition creating application 2201 can receive keywords input to search for email applications, access information in the email storage unit 101, and command the search unit 2251 to perform a search, it can be a completely separate application.

The communication unit 2202 transmits/receives information and command to/from the email application 2250. The search-condition creating application 2201 thus becomes an application that operates in connection with the email application 2250.

The communication unit 2202 receives email information displayed as search results from the search unit 2251 of the email application 2250. This enables the correct-email determining unit 115 to make a determination of the received email information.

In a process similar to that of the first embodiment, the search-condition creating application 2201 creates a search condition to search for a specific email stored in the email storage unit 101 of the email application 2250, and transmits the created search condition via the communication unit 2202 to the email application 2250. With this transmission as a trigger, the function of the search unit 2251 of the email application 2250 becomes operative.

The category-rank display unit 2203 displays a list of category types of the search target email. Because the category-rank display unit 2203 is identical to the category-rank display unit 121, except that it is arranged outside the display processor 107, explanations thereof will be omitted.

When the user inputs a keyword for performing a search, the email display detector 2204 detects whether the user is viewing an email in the email application 2250. That is, in the second embodiment, because there is a possibility that the user is not viewing an email when he inputs a keyword, it is detected whether he is viewing one.

Figure 23:
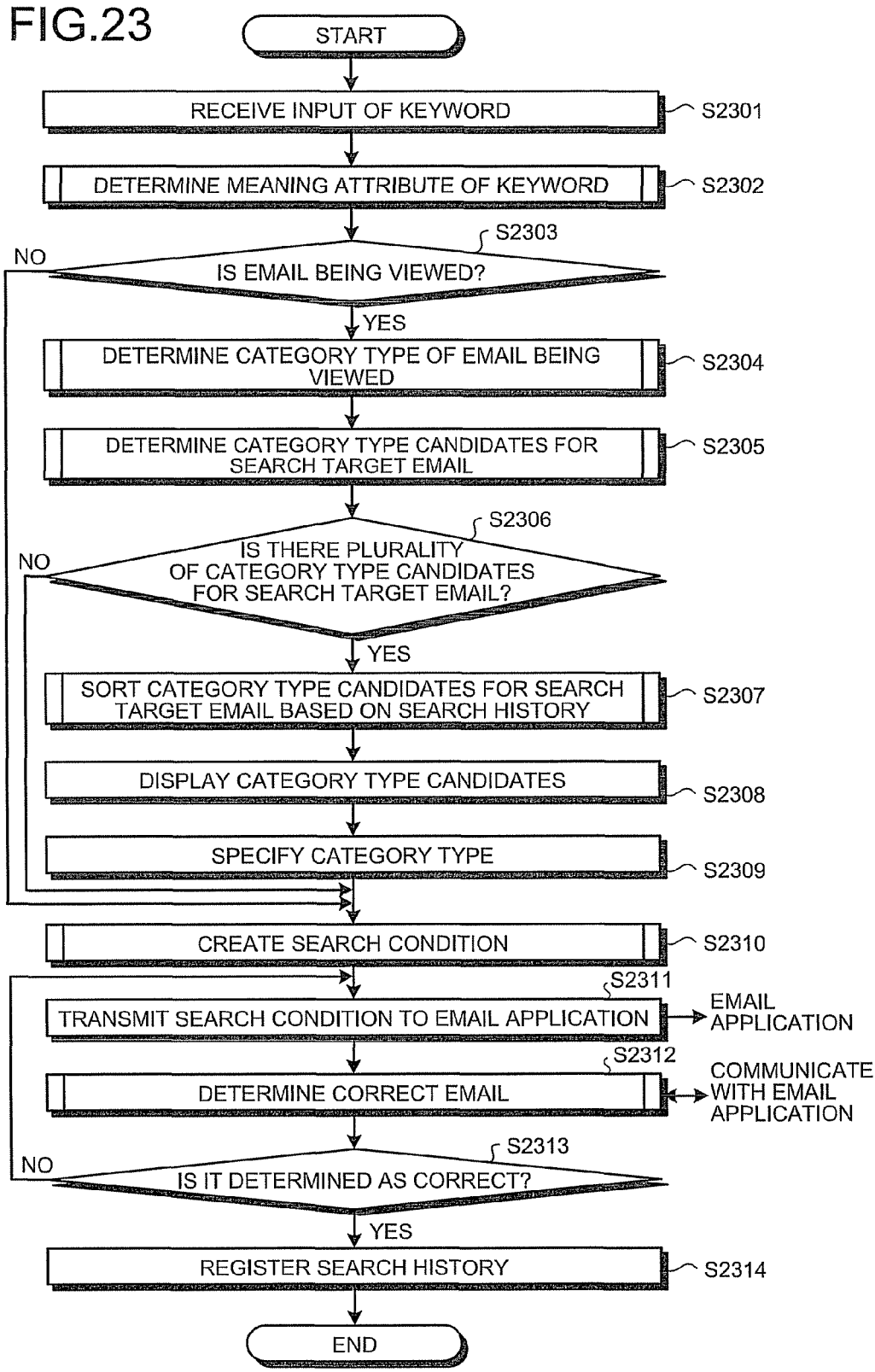
FIG. 23 is a flowchart of an overall process procedure in a search-condition creating application of the information processing apparatus according to the second embodiment.

An overall process procedure of the information processing apparatus 2200 will be explained with reference to FIG. 23.

As in steps S901 to S902 of FIG. 9, when a keyword is input via the communication unit 2202, a meaning attribute of the keyword is determined (steps S2301 and S2302).

The email display detector 2204 determines whether the user is viewing an email (step S2303). This process procedure is explained in detail later.

When the email display detector 2204 determines that the user is not viewing an email (NO at step S2303), no particular process is performed, and a search condition is created in step S2310 using only the keyword.

On the other hand, when the email display detector 2204 determines that the user is viewing an email (YES at step S2303), a search condition is created by processes similar to those of steps S903 to S909 of FIG. 9 (steps S2304 to S2310).

The communication unit 2202 transmits the created search condition to the email application 2250 (step S2311). The email application 2250 performs a search, provides a search result, and so on. The processes of the email application 2250 here are similar to those in steps S910 to S914 of FIG. 9. The email application 2250 can display the screen shown in FIG. 12 using a search screen display function provided by the search-condition creating application 2201, or can display the search result screen of a normal email application 2250.

The correct-email determining unit 115 communicates with the email application 2250 via the communication unit 2202, and performs a determination process to the correct email similar to that of step S914 of FIG. 9 (step S2312).

By performing steps similar to those in S915 and S916 of FIG. 9, it is determined whether the email is correct and the search history is registered (steps S2313 and S2314).

Figure 24:
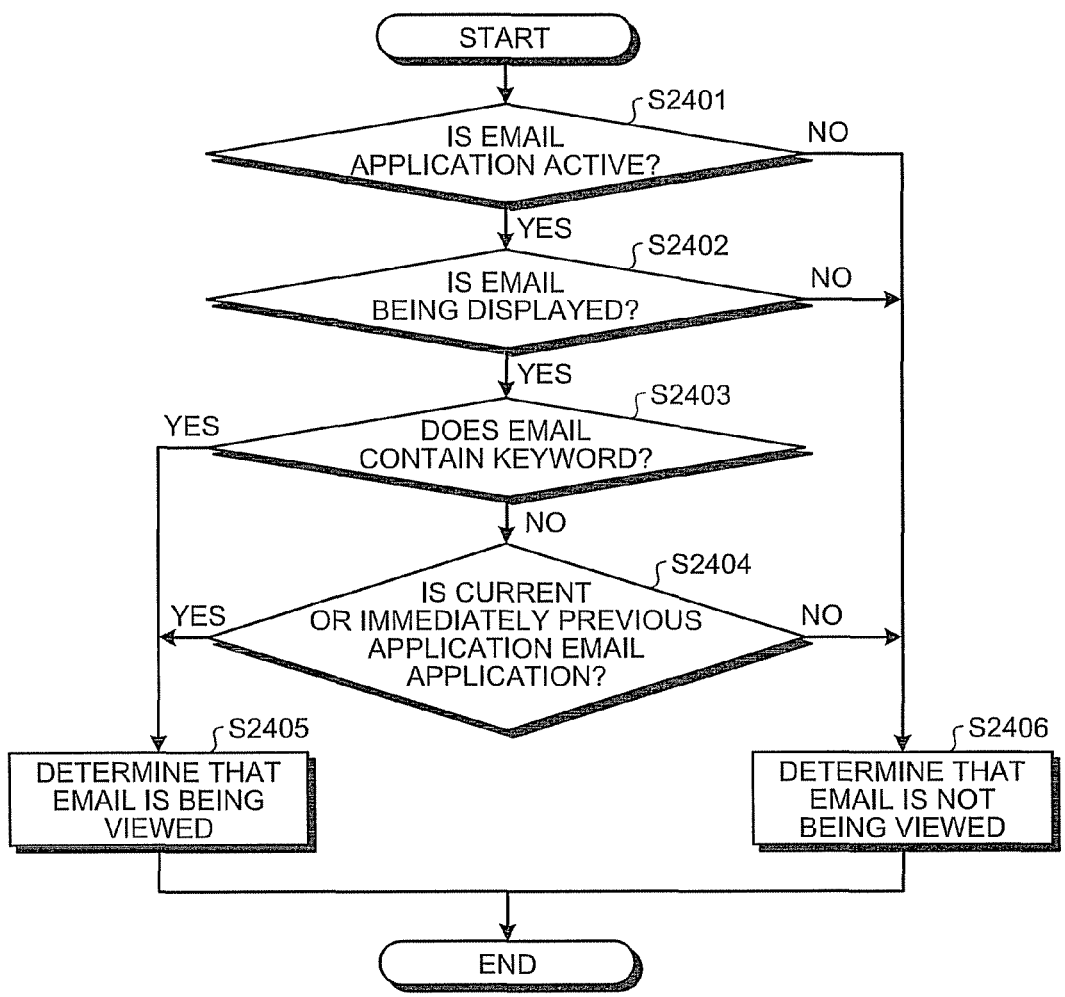
FIG. 24 is a flowchart of a process of determining whether a user is viewing an email performed by an email-display detecting unit.

A process procedure of determining whether an email is being viewed, performed by the email display detector 2204 shown in step S2303 of FIG. 23, will be explained with reference to FIG. 24.

First, the email display detector 2204 determines, via the communication unit 2202, whether the email application 2250 is active (step S2401).

When the email display detector 2204 determines that the email application 2250 is active (YES at step S2401), it determines whether an email is being displayed on the email application 2250 (step S2402).

When it determines that an email is being displayed (YES at step S2402), the email display detector 2204 reads, via the communication unit 2202, the category of the email that the email application 2250 is displaying, and determines whether it contains the input keyword (step S2403). When it determines that the email contains the keyword (YES at step S2403), it determines that the email is being viewed (step S2405).

On the other hand, when the email display detector 2204 determines that the email does not contain the keyword (NO at step S2403), it scans the window manager and determines whether the current or immediately previous active window is an email application (step S2404). When it determines that the current or previous active window is an email application (YES at step S2404), it determines that the email is being viewed (step S2405).

When the email display detector 2204 determines that the email application 2250 is not active (NO at step S2401), when it determines that an email is not being displayed (NO at step S2402), and when it determines that the current or previous active window is not an email application (NO at step S2404), it determines that the email is not being viewed (step S2406).

This process procedure makes it possible to determine whether the email is being viewed. Therefore, when creating a search condition for an application other than the email application 2250, an appropriate search condition can be created according to the status of the email application 2250.

Communications and joint mechanisms between the search-condition creating application 2201 and the email application 2250 can be realized using existing technologies, and therefore explanations thereof will be omitted. The second embodiment can thus obtain similar effects of those of the first embodiment.

The present invention is not limited to the above embodiments, and various modifications such as an example given below can be made.

In the first and second embodiments, processes are performed based on a keyword input to a text box. In a modification shown in FIG. 25, when the user selects a character string range as shown by reference numeral 2501, a character string contained in the selected character string range is received as a keyword; then, as in the first and second embodiments, a search condition is created after performing processes to determine meaning attributes and the like from the received keyword. The configuration of this modification can be either one of the email processing apparatus of the first embodiment and the search condition-creating application of the second embodiment.

Figure 25:
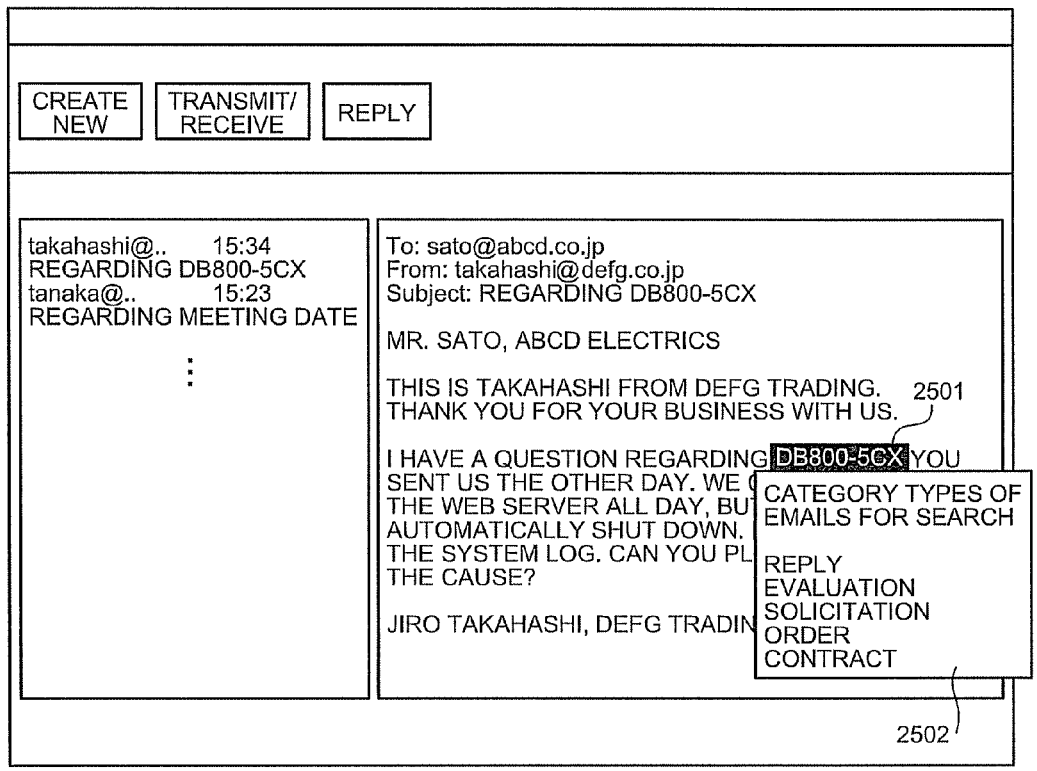
FIG. 25 is a schematic diagram illustrating a modification of a display of category type candidates after receiving selection of keywords on an email display screen.

When the category-rank display unit displays candidates for the category type of a search target email, as shown in region 2502 of FIG. 25, it can display a context menu near the character string selected as the keyword.

With this configuration, this modification can have the same effects as those in the first and second embodiments.

Figure 26:
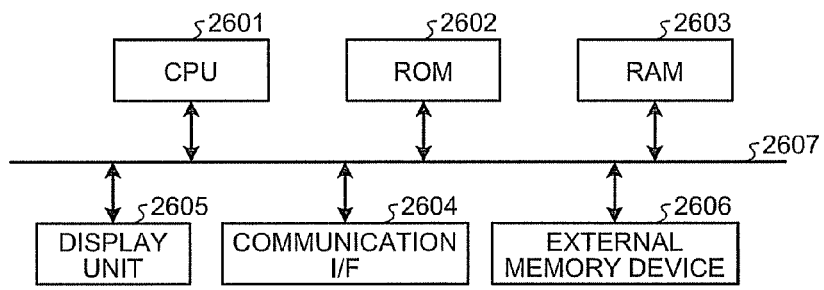
FIG. 26 is a schematic diagram illustrating a hardware configuration of an email processing apparatus and an information processing apparatus.

As shown in FIG. 26, the email processing apparatus 100 and the information processing apparatus 2200 have conventional hardware configurations using a computer, including a central processing unit (CPU) 2601, a read only memory (ROM) 2602, a random access memory (RAM) 2603, a communication interface (I/F) 2604, a display unit 2605, an external memory-device 2606, and a bus 2607 for connecting these.

An email processing program executed by the email processing apparatus 100, and a search condition-creating program executed by the information processing apparatus 2200, according to the above embodiments, are provided by incorporating them beforehand in the ROM 2602 or the like.

The email processing program executed by the email processing apparatus 100 and the search condition-creating program executed by the information processing apparatus 2200, according to the above embodiments, are provided by recording them in a file format that can be installed or executed on a computer-readable recording medium such as a CD-ROM, a flexible disk (FD), a CD-recordable (CD-R), and a digital versatile disk (DVD).

The email processing program and the search condition-creating program are loaded to a main memory device by reading them to the email processing apparatus 100 and the information processing apparatus 2200 from the recording medium, and executing them, whereby the various units described in the above software configuration are created in the main memory device.

The email processing program executed by the email processing apparatus 100 and the search condition-creating program executed by the information processing apparatus 2200 according to the embodiments can be stored in a computer connected to a network such as the Internet, and supplied by downloading them via the network. In addition, the email processing program and the search condition-creating program can also be supplied and distributed via a network such as the Internet.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An email processing apparatus, comprising:
a display unit configured to display an email stored in an email storage unit;
a correspondence storage unit configured to store a content category of the email displayed by the display unit and a search target category indicating a result category to which a search target email relating to the email displayed by the display unit belongs, in correspondence with a previous email;
an attribute-determining storage unit configured to store a keyword and an attribute acquired by abstracting the keyword, in correspondence with the previous email, the attribute being generated by abstracting the keyword to further narrow down;
a category-determination-information storage unit configured to store, in correspondence with the previous email, the content category and a content-determination character string indicating a character string contained in the email of the content category, wherein
instructions that are stored on a memory, when executed by a processor, instruct the email processing apparatus to perform:
a category determining unit configured to determine a content category of an email, from at least one of a main body of the email and a subject of the email stored in the email storage unit, the content category corresponding to the category-determination character string being the content category indicating the email in the category-determination information storage unit, when at least one of a main body of a currently displayed email and a subject of the currently displayed email displayed by the display unit contains the category-determination character string;
a keyword receiving unit configured to receive input of a keyword;
an attribute acquiring unit configured to acquire an attribute corresponding to the keyword input by the keyword receiving unit, from the attribute-determining storage unit;
a specifying unit configured to specify a search target category by narrowing down the search target categories to which a search target email relating to the email belongs based on the association with the correspondence storage unit using the content category determined by the category determining unit and the attribute acquired by the acquiring unit;
an acquiring unit configured to acquire search target information for searching for the search target email belonging to the search target category; and
a creating unit configured to create a search condition for searching for the search target email that contains the search target information from the email storage unit.

2. The apparatus according to claim 1, further comprising a character-string storage unit configured to store, in correspondence with one another, the search target category and a character string used as a search key, wherein
the acquiring unit acquires the character string information corresponding to the search target category as the search target information, from the character-string storage unit; and
the creating unit creates search condition for searching for the search target email containing the character string information as the search target email belongs to the search target category.

3. The apparatus according to claim 1, further comprising a search-history storage unit configured to store, in correspondence with one another, the search target category specified when searching a previous email, and a search target attribute held by a search target email detected as being belonging to the search target category, wherein
the acquiring unit acquires the search target attribute corresponding to the search target category as the search target information, from the search-history storage unit; and
the creating unit further creates a search condition for searching for a search target email having the search target attribute in the email storage unit.

4. The apparatus according to claim 3, further comprising:
a display unit configured to display the search target email as a search result of a search unit for searching the email storage unit based on the search condition;
a desired-email determining unit configured to determine whether the search target email displayed by the display unit is an email desired by a user; and a registration unit configured to register, in correspondence with each other, the search target category specified by the determining unit and the search target attribute held by the desired email in the search-history storage unit when the search target email is determined to be the desired email.

5. The apparatus according to claim 1, further comprising an email-display determining unit configured to determine whether the currently displayed email displayed by the display unit is being viewed by a user; wherein the category determining unit determines the content category that categorizes the currently displayed email being viewed by the user, from at least one of a main body of the currently displayed email being viewed by the user and a subject of the currently displayed email being viewed.

6. The apparatus according to claim 1, further comprising an input receiving unit configured to receive input of a keyword for searching for a search target email that is different from the currently displayed email displayed by the display unit; wherein the creating unit creates a search condition for searching for the search target email containing the search target information and the input keyword, from the email storage unit.

7. A non-transitory computer readable storage medium including programmed instructions for processing email, wherein the instructions, when executed by a computer, cause the computer to perform:

displaying an email stored in an email storage unit;

storing in a history storage unit and in correspondence with one another, a content category of the email and a search target category indicating a result category to which a search target email relating to the email belongs, in correspondence with a previous email;

storing a keyword and an attribute acquired by abstracting the keyword, in correspondence with the previous email, the attribute being generated by abstracting the keyword to further narrow down;

storing in a category-determination information storage unit, in correspondence with the previous email, the content category and a category-determination character string indicating a character string contained in the email of the content category;

determining a content category of an email, from at least one of a main body of the email and a subject of the email stored in the email storage unit, the content category corresponding to the category-determination character string being the content category indicating the email in the category-determination information storage unit, when at least on of a main body of a currently displayed email and a subject of the currently displayed email displayed by the display unit contains the category-determination character string;

receiving input of a keyword;

acquiring an attribute corresponding to the keyword input by the keyword receiving unit;

specifying a search target category by narrowing down the search target categories to which a search target email relating to the email belongs based on the association using the content category and the attribute;

acquiring search target information for searching for the search target email belonging to the search target category; and creating a search condition for searching for a search target email containing the search target information and belongs to the search target category, from the email storage unit.

8. The non-transitory computer readable storage medium according to claim 7, wherein the instructions cause the computer to further perform:

acquiring an attribute; wherein the specifying uses the attribute to further narrow down and specify the search target category.

9. The non-transitory computer readable storage medium according to claim 8, wherein the instructions cause the computer to further perform:

receiving input of a keyword; and storing the keyword and an attribute obtained by abstracting the keyword, in correspondence with each other in an attribute-determining storage unit; wherein the attribute acquiring acquires the attribute corresponding to the keyword input in the receiving, from the attribute-determining storage unit.

* * * * *